US012192373B2

(12) United States Patent
Mahony

(10) Patent No.: US 12,192,373 B2
(45) Date of Patent: Jan. 7, 2025

(54) PROOF OF MAJORITY BLOCK CONSENSUS METHOD FOR GENERATING AND UPLOADING A BLOCK TO A BLOCKCHAIN

(71) Applicant: BRYT LLC, Los Angeles, CA (US)

(72) Inventor: Jeffrey W. Mahony, Costa Mesa, CA (US)

(73) Assignee: BRYT LLC, Los Angeles, CA (US)

( * ) Notice: Subject to any disclaimer, the term of this patent is extended or adjusted under 35 U.S.C. 154(b) by 962 days.

(21) Appl. No.: 16/965,975

(22) PCT Filed: Apr. 25, 2018

(86) PCT No.: PCT/US2018/029408
§ 371 (c)(1),
(2) Date: Jul. 29, 2020

(87) PCT Pub. No.: WO2019/147295
PCT Pub. Date: Aug. 1, 2019

(65) Prior Publication Data
US 2020/0366495 A1    Nov. 19, 2020

Related U.S. Application Data

(60) Provisional application No. 62/623,486, filed on Jan. 29, 2018.

(51) Int. Cl.
*H04L 29/06* (2006.01)
*G06F 16/23* (2019.01)
(Continued)

(52) U.S. Cl.
CPC ........ *H04L 9/3239* (2013.01); *G06F 16/2379* (2019.01); *G06Q 20/3674* (2013.01);
(Continued)

(58) Field of Classification Search
None
See application file for complete search history.

(56) References Cited

U.S. PATENT DOCUMENTS

2011/0219072 A1\* 9/2011 Yang ................. H04L 67/14
709/204
2013/0080385 A1\* 3/2013 Ho .................... G06F 16/273
707/613

(Continued)

FOREIGN PATENT DOCUMENTS

WO    2017-192837    11/2017

*Primary Examiner* — Shin-Hon (Eric) Chen
*Assistant Examiner* — Hassan A Hussein
(74) *Attorney, Agent, or Firm* — Barnes & Thornburg LLP

(57) ABSTRACT

Embodiments are provided herein describe a proof of majority block consensus method based upon a mutually enforced collaboration between the nodes. A node may maintain a random subset of connected peer nodes, refreshed at every epoch through network gossiping protocols. The node may propagate received transactions to selected peers in the random subset. The node may generate a transaction ballot from received transactions and iteratively update the transaction ballot by mutual exchanges with other nodes until the network converges. The node may generate a block—and a hash thereof—based upon its understanding of the transaction ballot. The node may also receive hashes from other connected nodes and identify a hash generated by the majority of peer nodes. If the node determines that its own hash is the one generated by the majority of peer nodes, the node may update its local copy of the blockchain by appending its block.

14 Claims, 22 Drawing Sheets

(51) Int. Cl.

| | |
|---|---|
| *G06Q 20/36* | (2012.01) |
| *G06Q 20/38* | (2012.01) |
| *H04L 9/12* | (2006.01) |
| *H04L 9/32* | (2006.01) |
| *H04L 9/40* | (2022.01) |
| *H04L 67/10* | (2022.01) |
| *H04L 9/00* | (2022.01) |

(52) U.S. Cl.
CPC ........... *G06Q 20/3827* (2013.01); *H04L 9/12* (2013.01); *H04L 9/3297* (2013.01); *H04L 63/123* (2013.01); *H04L 67/10* (2013.01); *G06Q 2220/00* (2013.01); *H04L 9/50* (2022.05)

(56) References Cited

U.S. PATENT DOCUMENTS

| | | | | |
|---|---|---|---|---|
| 2015/0347627 | A1* | 12/2015 | Brueckner | H04L 67/34 709/202 |
| 2017/0236123 | A1* | 8/2017 | Ali | G06Q 20/3825 705/75 |
| 2017/0344580 | A1* | 11/2017 | King | H04L 9/3247 |
| 2018/0082296 | A1* | 3/2018 | Brashers | H04L 9/3236 |
| 2018/0083785 | A1* | 3/2018 | Shields | H04W 12/033 |
| 2018/0102013 | A1* | 4/2018 | Spanos | G06F 21/64 |
| 2018/0137242 | A1* | 5/2018 | Fan | G06F 16/283 |
| 2018/0253702 | A1* | 9/2018 | Dowding | H04L 63/123 |
| 2019/0036766 | A1* | 1/2019 | Popov | H04L 67/34 |
| 2019/0147532 | A1* | 5/2019 | Singh | H04L 9/3239 705/35 |

\* cited by examiner

PROOF OF MAJORITY BLOCK CONSENSUS METHOD FOR GENERATING AND UPLOADING A BLOCK TO A BLOCKCHAIN

This application is a U.S. National Stage Application of International Application No. PCT/US2018/029408 filed on Apr. 25, 2018, which claims priority to and the benefit of priority of U.S. Provisional Patent Application No. 62/623,486 filed on Jan. 29, 2018, all of which are hereby incorporated by reference in their entirety for all purposes as if fully set forth herein.

TECHNICAL FIELD

This application relates generally to blockchain technology, more specifically to a proof of majority block consensus method that provides technical solutions to several technical shortcomings in existing blockchain implementations.

BACKGROUND

Despite providing a degree of decentralized transaction authentication and processing, conventional blockchain technologies have several technical shortcomings. The current block consensus techniques relying upon proof of work, proof of stake, and proof of authority not only require massive processing power and high network energy consumption but also cut against blockchain's professed goal of decentralization and democratization. And, despite having such large processing and network footprints, the current block consensus techniques cannot even guarantee that all transactions will be processed and uploaded to the blockchain.

Each of the proof of work, proof of stake, and proof of authority block consensus techniques rely upon selecting a single node—via some undemocratic mechanism—to produce a block and extend the produced block for validation (i.e. "voting" that the block should be appended to the blockchain) during a blockchain epoch. In proof of work, a node that can iteratively arrive at a mathematical solution faster than other nodes to generate a hash value fulfilling the required criteria becomes the voting node for the current blockchain epoch. In proof of stake, a node among the largest coin holder nodes is selected as a voting node. In proof of authority, the voting node is randomly selected from a set of nodes deemed "worthy" by a centralized decision making body. Whatever the selection technique, the selected single node then becomes a de facto authority voting for the entire network in the current blockchain epoch—doing away with decentralization and democratization. To put it differently: Proof of work therefore favors nodes with massive computing resources akin to a server farm thus out-resourcing small computing devices; proof of stake inherently favors concentrate power in the hands of few based on wealth (i.e. the amount of coins held); and proof of authority mandates that a centralized decision making body effectively run the network. Therefore, in the current blockchain technologies, ten or fewer nodes among thousands of nodes dominate generating and uploading blocks to the blockchain.

Proof of work block consensus, a dominant voting technique used by conventional blockchains, has massive processing and network footprints. In this technique, regardless of who first solves the mathematical problem of generating a hash with the required constraints and submits their block for validation (or "mines" one or more "coins"), the entire network was actively attempting to win and thus spending a lot of processing power and network energy. More specifically, each node was attempting to gather as many transactions as possible and iteratively cycling through various inputs to generate a hash fulfilling the required criteria. All of these processes require massive processing and network energy due to the sheer processing power required for guessing an input to the required hash to generate a block and massive network transmissions required for presenting the block to the rest of the nodes using costly gossiping protocols. Furthermore, in such a competitive environment, each node has an incentive not to collaborate with other nodes. For example, a node receiving transaction information may not forward the received transaction information lest the other nodes win the competition.

Additionally, low fee transactions may be "priced-out" in the conventional blockchains. These fees for these transactions may not be profitable for the nodes to mine (i.e. solve the mathematical problem of generating a hash fulfilling a required criteria). Therefore, there is no guarantee that all transactions will be processed. Therefore, the immense possibility of blockchain as a back-end infrastructure support for a stable medium of exchanges is bound to remain untapped.

Therefore, conventional blockchains are inherently bound to be computationally inefficient requiring massive processing power and network energy. Although not intended by the original creators, conventional blockchains have become rapidly centralized and undemocratic because of the inherent flaws in the current block consensus techniques. The current block consensus techniques favor network nodes with larger computing resources, which, over time will exponentially increase centralization and foster non-democratization.

SUMMARY

What is therefore desired is block consensus method that ensures a decentralized and democratic blockchain, has low latency, low processing power requirements, low network energy, and provides frictionless and guaranteed transaction processing. What is further required is a block consensus method that generates mining rewards for collaborative participation in block generation while also providing attack vector mitigation.

Embodiments disclosed herein to solve the aforementioned problems and other technological problems. In particular, the embodiments disclosed herein describe a proof of majority block consensus method based upon a mutually enforced collaboration between the nodes. To stage the downstream processes, each network node may generate and refresh once per epoch using network gossiping protocols, a random subset of connected peer nodes. As the transactions are received, each network node may propagate the received transactions to the peer nodes in the respective random subset such that the received transactions are not lost due to node churn and attack vectors. After one or more cycles of transaction propagation, each node may construct a transaction ballot, which is then exchanged with connected peer nodes in the random subset using one or more exchange cycles. Once the exchanges of the transaction ballots converges the network, each node may generate a block based upon its understanding of the transaction ballot and generate a hash for the block. Each node may also receive hashes from other connected nodes and identify a hash generated by the majority of peer nodes. If a network node determines that its own hash is the one generated by the majority of peer nodes, the network node may update its local copy of the blockchain by appending its block. However, if the network node determines that its hash different from the hashes generated by the majority of peer nodes, the network node may request a block from a node generating the majority hash and update the local copy of the blockchain by appending a block received in response to the request.

In an embodiment a method comprises updating, by a network node of a plurality of distributed network nodes via network gossiping, a peers queue containing descriptors of a random subset of peer nodes selected from connected peer nodes; receiving, by the network node, transaction information from a first peer node in the random subset of peer nodes; appending, by the network node, a transaction descriptor for a transaction associated with transaction information to an unconfirmed transactions queue; transmitting, by the network node, the transaction descriptor in the unconfirmed transactions queue to a second peer node in the random subset of peer nodes; generating, by the network node, a transaction ballot containing a first subset of transaction descriptors in the unconfirmed transactions queue, wherein the subset of the transaction descriptors is based upon block size of a blockchain; receiving, by the network node, a second subset of transaction descriptors from a third peer node in the random subset of peer nodes; updating, by the network node, the transaction ballot by appending one or more transaction descriptors from the first set of transactions, wherein the one or more transaction descriptors are not present in the transaction ballot; transmitting, by the network node, the updated transaction ballot to a fourth node in the random subset of peer nodes; generating, by the network node, a next block to be appended to the blockchain and containing the transaction descriptors in the updated transaction ballot; generating, by the network node, a first hash of the next block; appending, by the network node, the first hash to a hash votes queue; receiving, by the network node, from a plurality of connected peers a plurality of hashes of the respective blocks generated by the plurality of connected blocks; and upon determining by the network node that the first hash belongs to a majority of the received hashes: appending, by the network node, the next block to a local copy of the blockchain.

In another embodiment, a computer readable non-transitory medium contains one or more computer instructions, which when executed by a processor of a network node cause the processor to: update a peers queue containing descriptors of a random subset of peer nodes selected from connected peer nodes; receive transaction information from a first peer node in the random subset of peer nodes; append a transaction descriptor for a transaction associated with transaction information to an unconfirmed transactions queue; transmit the transaction descriptor in the unconfirmed transactions queue to a second peer node in the random subset of peer nodes; generate a transaction ballot containing a first subset of transaction descriptors in the unconfirmed transactions queue, wherein the subset of the transaction descriptors is based upon block size of a blockchain; receive a second subset of transaction descriptors from a third peer node in the random subset of peer nodes; update the transaction ballot by appending one or more transaction descriptors from the first set of transactions, wherein the one or more transaction descriptors are not present in the transaction ballot; transmit the updated transaction ballot to a fourth node in the random subset of peer nodes; generate a next block to be appended to the blockchain and containing the transaction descriptors in the updated transaction ballot; generate a first hash of the next block; append the first hash to a hash votes queue; receive from a plurality of connected peers a plurality of hashes of the respective blocks generated by the plurality of connected blocks; and upon determining by the processor that the first hash belongs to a majority of the received hashes: append the next block to a local copy of the blockchain.

BRIEF DESCRIPTION OF THE DRAWINGS

The accompanying drawings constitute a part of this specification and illustrate embodiments of the subject matter disclosed herein.

DETAILED DESCRIPTION

Figure 1:
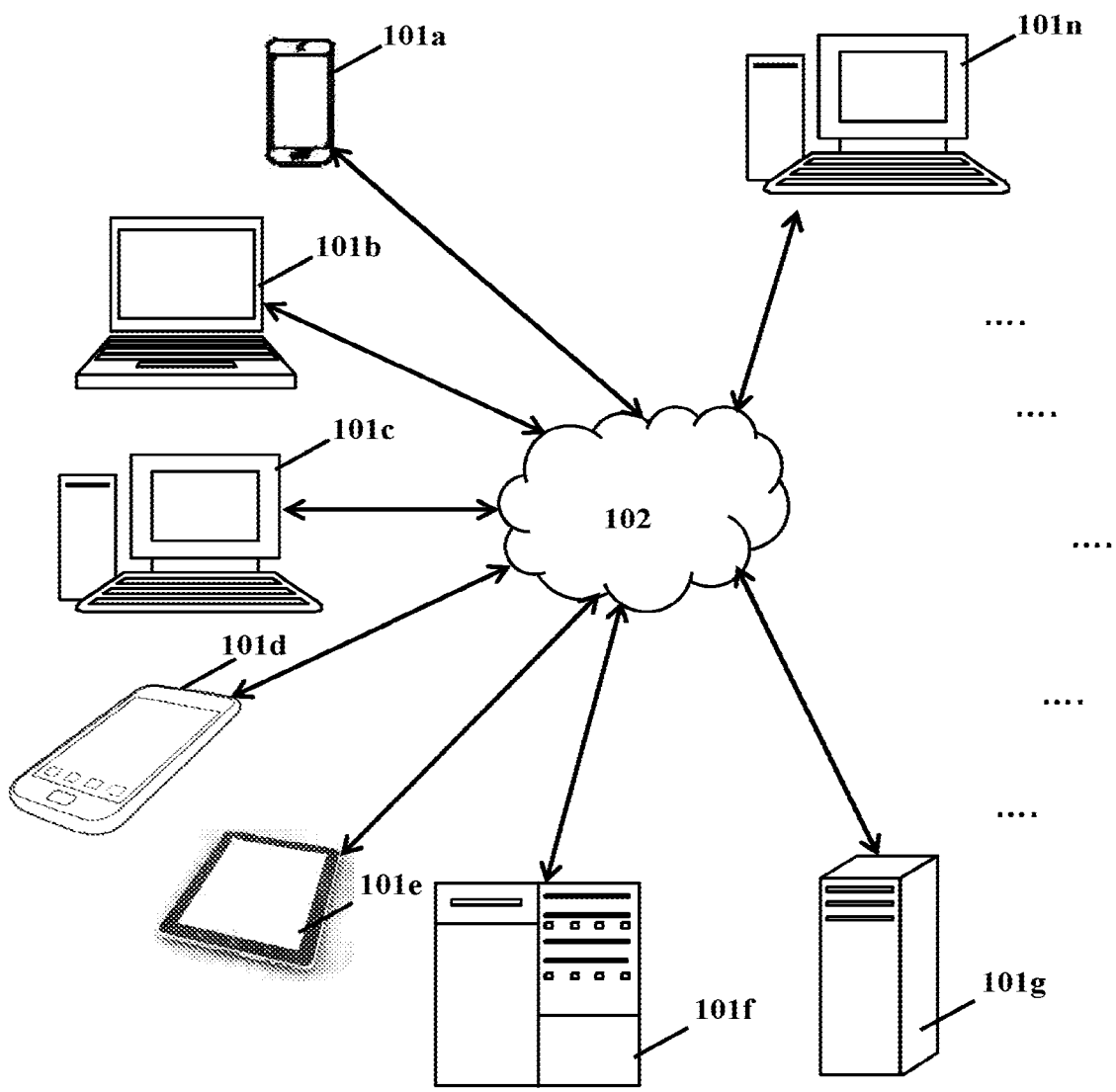
FIG. 1 shows an exemplary system implementing a proof of majority block consensus method, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The proof of majority method is a collaborative block consensus method, wherein the network nodes maintain random lists of connected peers, propagate transaction information to their connected peers in the respective random lists, come to a consensus on a list of transactions to be uploaded as a next block, and perform a network wide collaborative voting such that the block generated by the majority of the network nodes is appended as a next block in the blockchain. By implementing these processes, the proof of majority method delivers a decentralized and democratized blockchain with low latency, low processing power, low network energy, frictionless and guaranteed transaction processing, attack vector mitigation, and mining rewards.

Each network node may maintain a randompeers queue containing descriptors for randomly selected connected peer nodes. The network node may refresh the randompeers queue every blockchain epoch (or network epoch) by exchanging messages containing node descriptors with other peer nodes using network gossiping protocols. Each network node may use its refreshed randompeers queue to stage downstream processes of transaction propagation, transaction balloting, and network wide voting to eventually generate a next block. Each randompeers queue—refreshed every epoch to ensure randomness from the respective node's point of view—may provide the respective node with local knowledge of the rest of the system for a network convergence of global convergence using only local information.

In the transaction propagation process (or method), each node may receive unconfirmed transactions and maintain the received transactions in an unconfirmedtransactions queue. Furthermore, each node may transmit one or more transactions in the queue to selected highest aged peers in the randompeers queue such that the unconfirmed transactions are propagated throughout the network. The goal of the transaction propagation network may not be to saturate the network, but rather mitigate a network wide loss of transaction information in a high-churn distributed network environment wherein different nodes may be online intermittently. Furthermore, the transaction propagation may mitigate the efforts of dishonest or corrupt nodes to flood the network with invalid transactions. In other words, even though network saturation may not be achieved during transaction propagation, the transactions are propagated to a sufficient number of nodes that the probability of transaction information loss due to high node churn and the presence of dishonest or corrupt nodes is significantly reduced.

The transaction balloting process (or method) may synchronize transaction information across the nodes in the network. Operationally, each node may maintain a transactionballot containing a time-ordered list of transactions based upon the node's understanding of the state of the network at that time. The nodes may exchange their transactionballots, with the receiving nodes updating their respective transactionballots with heretofore unknown transactions. After a few cycles of the exchange of the transactionballots, the probability of network convergence approaches 1 such that every node in the network may have the same transactionballot for generating a next block for the blockchain.

The network wide voting process (or method) may allow the nodes collaboratively come to a consensus on the winning block for the blockchain. Each node may generate a respective block based on its understanding of the state of the network during the transaction balloting process. Each node may then generate a hash of its block and store the hash in its hashvotes queue. All the nodes may exchange their respective hashes with each other and populate their respective hashvotes queues. Once the hashvotes queues have been populated, each respective node may tally the hashes. The hash receiving the majority of votes may be deemed the winning hash, and the corresponding block may be elected as a next block in the blockchain. Should a node not generate the winning block, the node may repetitively query other nodes for the winning block such that it can properly maintain its copy of the blockchain.

In the processes described above, there is no competitive mining as in the conventional blockchain implementations. In other words, transforming a transaction from an unconfirmed state to a confirmed state is devoid of a fee. Instead node operators may be compensated for collaboration: for participating in the election of new blocks to the blockchain by building blocks and submitting them to their connected peer nodes for voting. Such participation may be tracked and participating node operators may be periodically compensated through rewards to their respective wallets from revenues generated by the entire ecosystem.

Therefore, the proof of majority method disclosed herein may maintain a democratized and decentralized blockchain. Every step of the method may be collaborative, wherein each node is incentivized to propagate the received information to other nodes and not to scramble to generate a block to outpace other nodes. Furthermore, a winning node is time-blocked for a predetermined number of epochs and therefore pooling of computing resources will not be beneficial. And, the rewards are proportionally distributed based on participation and not for generating the winning block ahead of other nodes. The proof of majority method therefore is inherently democratic and decentralized where the playing field is always leveled no matter the amount of computing resources each node possesses. In other words, a full time mining server farm may have the same clout within the network as part time mining smartphone.

The proof of majority method also fosters a blockchain with low latency, low network energy, and low processing power. Because there is a probability approaching 1 that the block during an epoch is created from the same set of ordered transactions, each node may create the same block except for the dishonest or corrupted nodes. Furthermore, the blocks generated by the dishonest or corrupt nodes are quickly orphaned and discarded. Therefore, there may be no need for block exchanges between the nodes. Exchanges of hashes of those blocks may suffice for the network wide voting and consensus. Exchange of blocks may be required if and only if a block does not have a winning hash. A mere exchange of hashes is significantly faster and has significantly smaller network footprint than conventional blockchain implementations. Furthermore, there may no proof of work competition here; the nodes may not scramble to generate hashes as soon as they receive a transaction: the nodes agree on a set of transactions before any hash is generated. This process is computationally much lighter than a conventional proof of work block consensus method.

Furthermore, the nodes may collaboratively mitigate attack vectors. Provided there is a sufficient number of honest nodes sharing and synchronizing a valid set of information, dishonest or corrupted nodes may quickly be flagged and information being propagated from these nodes may be readily ignored. Also, when a node generates the winning block first, that particular node is forbidden for generating blocks for a predetermined number of epochs to prevent dishonest or corrupted nodes from repetitively generating invalid blocks. Apart from the mitigation, the proof of majority method provides for a self-healing network. A node suspected to be dishonest or corrupted may be given a chance after a predetermined number of epochs to participate in information sharing and block generation.

Exemplary System

FIG. 1 shows an exemplary system 100 comprising network nodes 101 implementing a proof of majority block consensus method. The network nodes 101 may be interconnected through a network 102. The network nodes (or simply "nodes") implementing the majority block consensus method do not require a large processing power, and therefore computing devices with lighter processing power may be used as the network nodes. As shown in system 100, the network nodes 101 may range from a smartphone 101a to a server 101f. Other examples of the network nodes may include a laptop computer 101b, a desktop computer 101c, a smartphone 101d, a tablet computer 101e, a server computer 101g, and a desktop computer 101n.

The network 102 may interconnect the network nodes 101 to provide a peer to peer communication between the network nodes 101. Examples of the network 102 include, but are not limited to, Local Area Network (LAN), Wireless Local Area Network (WLAN), Metropolitan Area Network (MAN), Wide Area Network (WAN), and the Internet. The communication over the network 102 may be performed in accordance with various communication protocols, such as Transmission Control Protocol and Internet Protocol (TCP/IP), User Datagram Protocol (UDP), and IEEE communication protocols.

One or more network nodes 101 may implement respective wallets. The proof of majority method may use elliptical curve cryptography or quantum computing resistant cryptography to ensure confidentiality, authenticity, and non-reputability of all transactions originated with the wallets. Wallets may be identified by addresses, which may be derived in part from one-way mutations of Ed25519 public keys. A wallet address may be a base-323 encoded triplet comprising: (1) network byte, (2) 160-bit hash of the wallet's public key, and (3) 4 byte checksum to allow for quick recognition of mistyped addresses. One or more network nodes 101 may perform the following steps to convert a public key into a wallet address: (1) Perform 256-bit Sha3 on the public key, (2) Perform 160-bit Ripemd of hash resulting from step 01, (3) Prepend version byte to Ripemd hash (either 0x68 or 0x98), (4) Perform 256-bit Sha3 on the result, take the first four bytes as a checksum, (5) Concatenate output of step 03 and the checksum from step 04, (6) Encode result using base32.

The proof of majority method may require the use of cryptography for encrypting communications between the network nodes 101. An exemplary cryptography may be Elliptic Curve Cryptography using the Twisted Edwards Curve to help ensure security, speed, and low processing requirement as follows:

$$-x^2 + y^2 = 1 - \frac{121665}{121666}x^2 y^2$$

over a finite field defined by the prime number $2^{225}-19$ together with Ed25519 digital signal algorithm. The based point for a corresponding group G may be called B. The group may have $q=2^{252}-27742317777372353535851937790883648493$ elements. Every group element A may be encoded into a 256-bit integer A' that can also be interpreted as 256-bit string and A' can be decoded to receive A again.

For hashing a block in network wide voting method, each of the network nodes 101 may use 512-bit SHA3 hash function.

Exemplary Queues Maintained in Respective Memory of Each Network Node

Each network node may maintain multiple data record queues in its memory to implement various processes (or methods) of the proof of majority block consensus method. A few exemplary queues are detailed below.

Figure 2A:
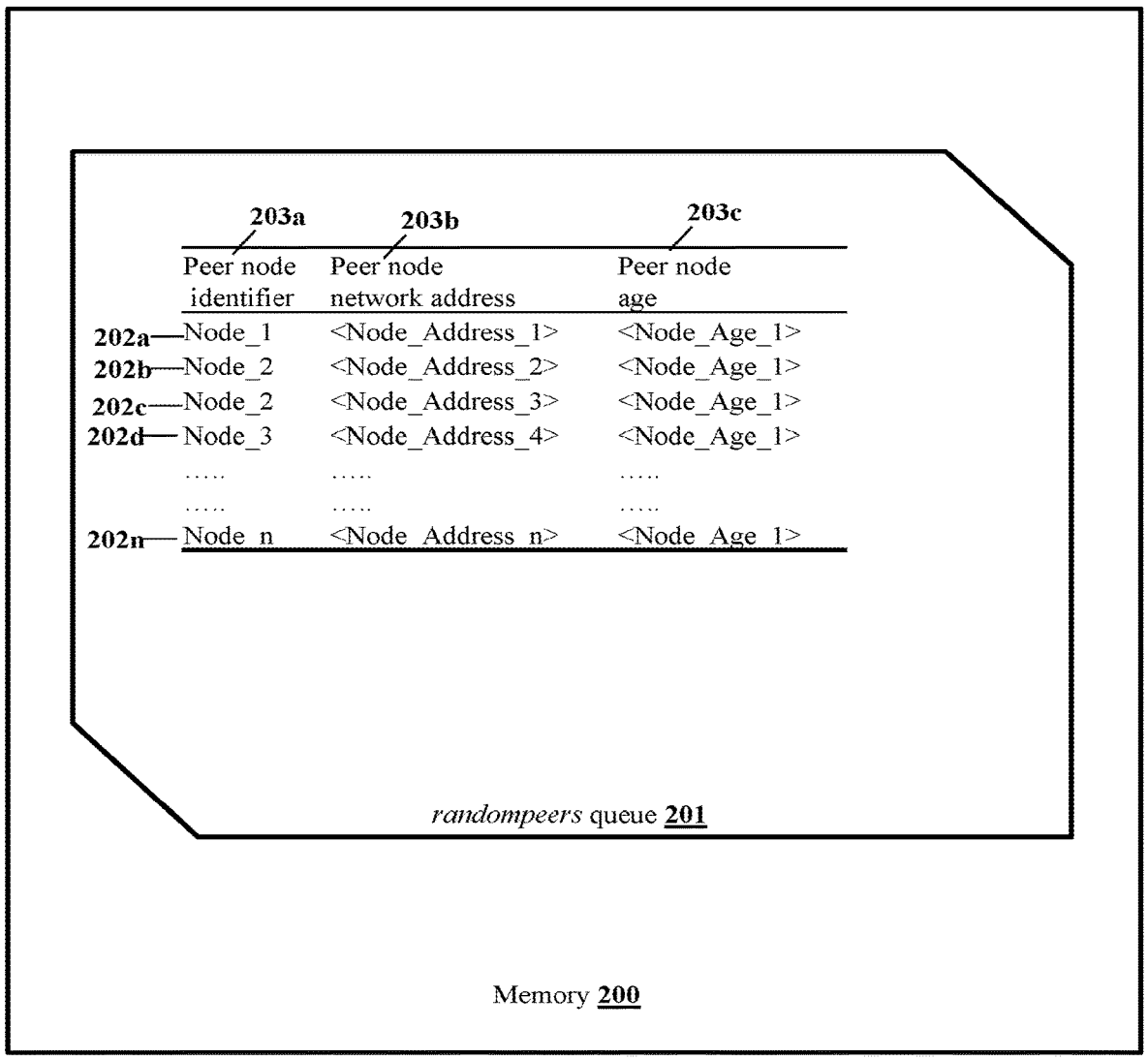
FIG. 2A shows an exemplary randompeers queue, according to an exemplary embodiment.

FIG. 2A shows a memory 200 of an exemplary network node storing a randompeers queue 201. The network node may populate or refresh the randompeers queue 201 every blockchain epoch. The randompeers queue may contain a plurality of descriptors 202 collected and/or refreshed by the network node during the current epoch using network gossiping protocols. Each descriptor 202 may be include a data record containing a plurality of data fields 203 such as peer node identifier 203a, peer node network address 203b, and peer node age 203c. The peer node identifier data field 203a may include a piece of information identifying a peer node. In some instances, the peer node identifier may be selected by the network node based on the order the peer node descriptor was received by the network node. The peer node age field 203c may contain information about the age of the corresponding peer node. In some instances, the age may be in terms of blockchain epochs. For example, a first peer node descriptor 202a may have an age of fifteen blockchain epochs and a second peer node descriptor 202b may have an age of twenty blockchain epochs. Refreshing the randompeers queue 201 at the beginning of every blockchain epoch allows the network node to maintain a fresh set of peer descriptors 202 to stage the subsequent processes.

Figure 2B:
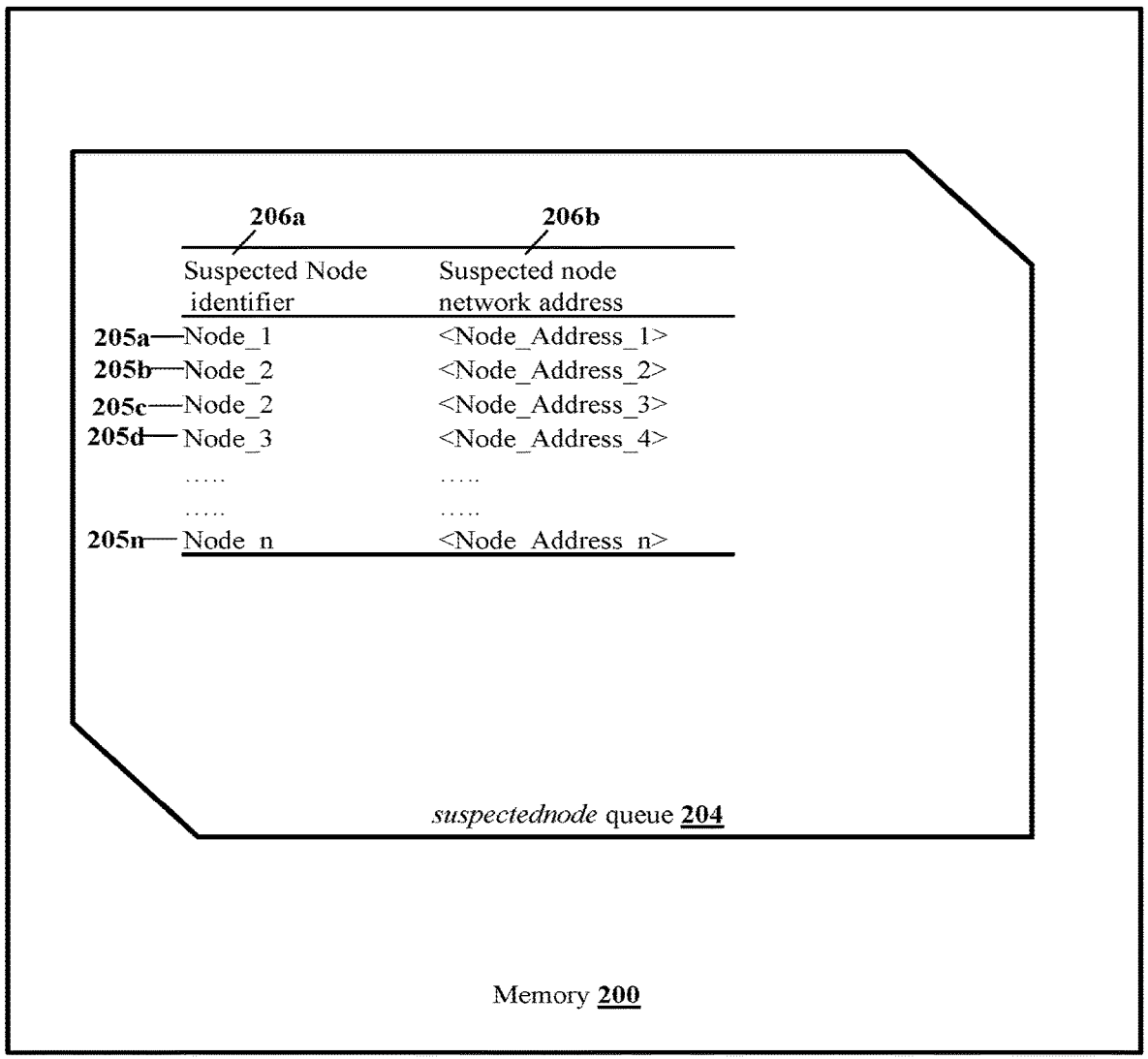
FIG. 2B shows an exemplary suspectednode queue, according to an exemplary embodiment.

FIG. 2B shows a memory 200 of an exemplary network node storing a suspectednode queue 204. The suspectednode queue 204 may contain node descriptors 205 for peer nodes that have been flagged either to be dishonest or corrupted by dishonest nodes. Each node descriptor 205 may contain a suspected node identifier 206a and a suspected node network address 206b. The network node may always check whether a peer node that sends in any information such as a transaction, a transaction ballot, and/or a hash is in the suspectednode queue 204. If the peer node is in the suspectednode queue, the network node may not process and simply drop the information received from the peer node. Furthermore, prior to sending any information to a peer node, the network node may check whether a peer node is in the suspectednode queue. Therefore, the suspectednode queue 204 may be used by the network node to mitigate attack vectors from dishonest or corrupted nodes.

In general, nodes that are not behaving per the trusted peer processes may be placed on the internal suspectednode queue 204 of any connected active peer that observes related infractions. This information may not be forwarded to any other connected active peers (including the node placed on the suspectednode queue 204) nor it may be gossiped to the rest of the network. This may prevent dishonest nodes from disrupting the network by simply forwarding or gossiping erroneous trust information to other nodes in the network. A node may also be placed onto a suspectednode queue if it either timeouts during an information exchange or if it delivers a block during the network wide voting protocol that does not confirm to the majority of blocks up for election. However, placement on a suspectednode queue 204 may not mean permanent exile. Instead, a node on a suspectednode queue 204 may be ignored until the blockchain height grows sufficiently to obscure any malicious or erroneous information the node is or was attempting to exchange—i.e., all communication attempts while on a suspectednode queue 204 are ignored for a determinant number of blocks, not permanently. For the consensus methods disclosed herein, an increase in blockchain height of 250 may be sufficient blockchain addition before allowing a node to be removed from a suspectednode queue 204. Because there is no distinction between a dishonest node and a corrupted node, this consensus model may allow for all nodes to eventually attempt to reenter in the network and to follow the rules of all the network protocols—i.e., keep the network as large as possible, even if there is a constant mitigation of dishonest nodes.

Figure 2C:
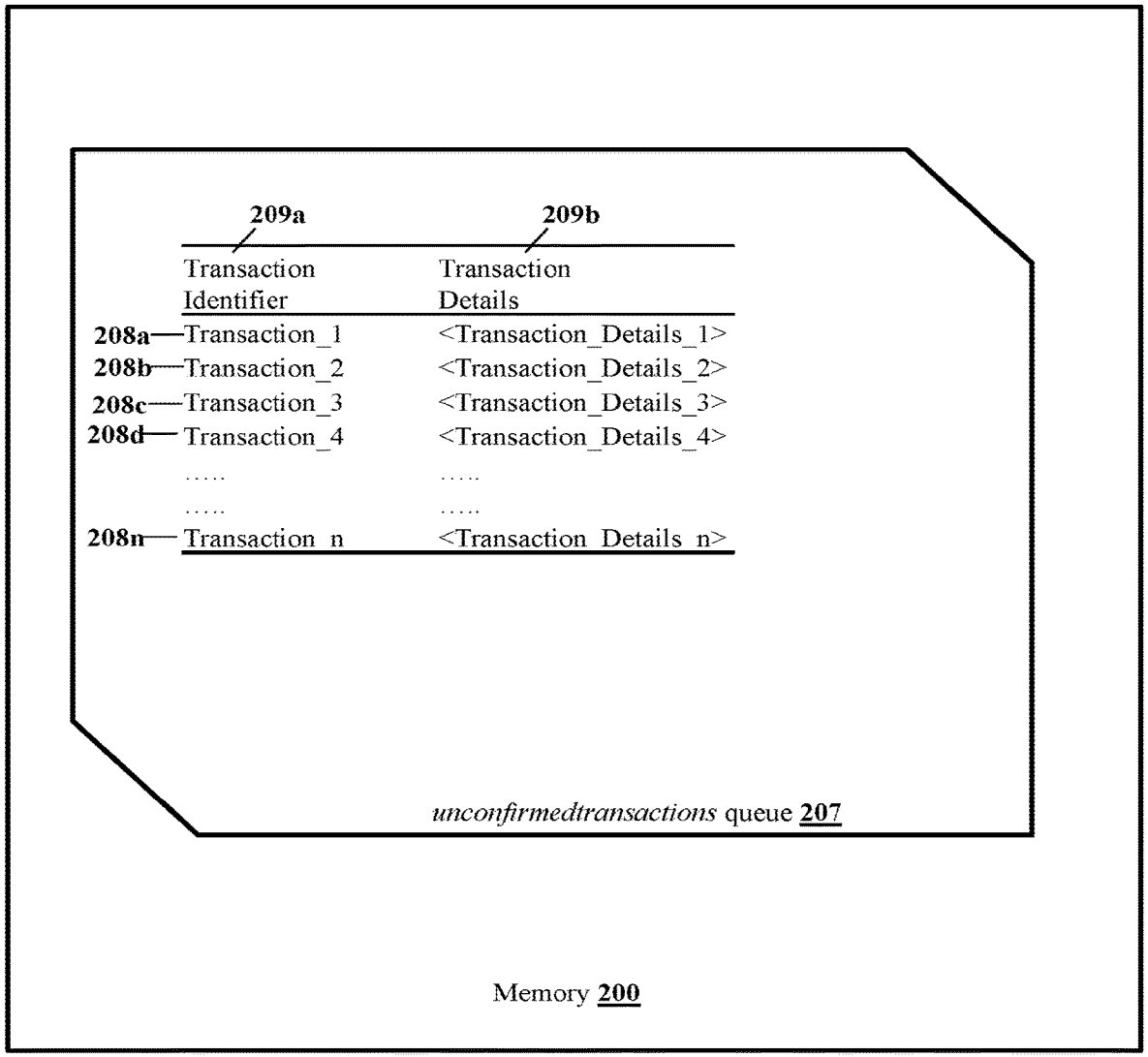
FIG. 2C shows an exemplary unconfirmedtransactions queue, according to an exemplary embodiment.

FIG. 2C shows a memory 200 of an exemplary network node storing an unconfirmedtransactions queue 207. The network node may use the unconfirmedtransactions queue 207 during the transaction propagation process. The unconfirmedtransactions queue 207 may contain a plurality of descriptors 208 of a plurality of valid but unconfirmed transactions. Each of the descriptors 208 may contain a plurality of data fields 209. For instance, two exemplary data fields 209a, 209b are shown in FIG. 2C. A first data field 209a may be a transaction identifier data field and a second data field 209b may be a transaction details data field.

Figure 2D:
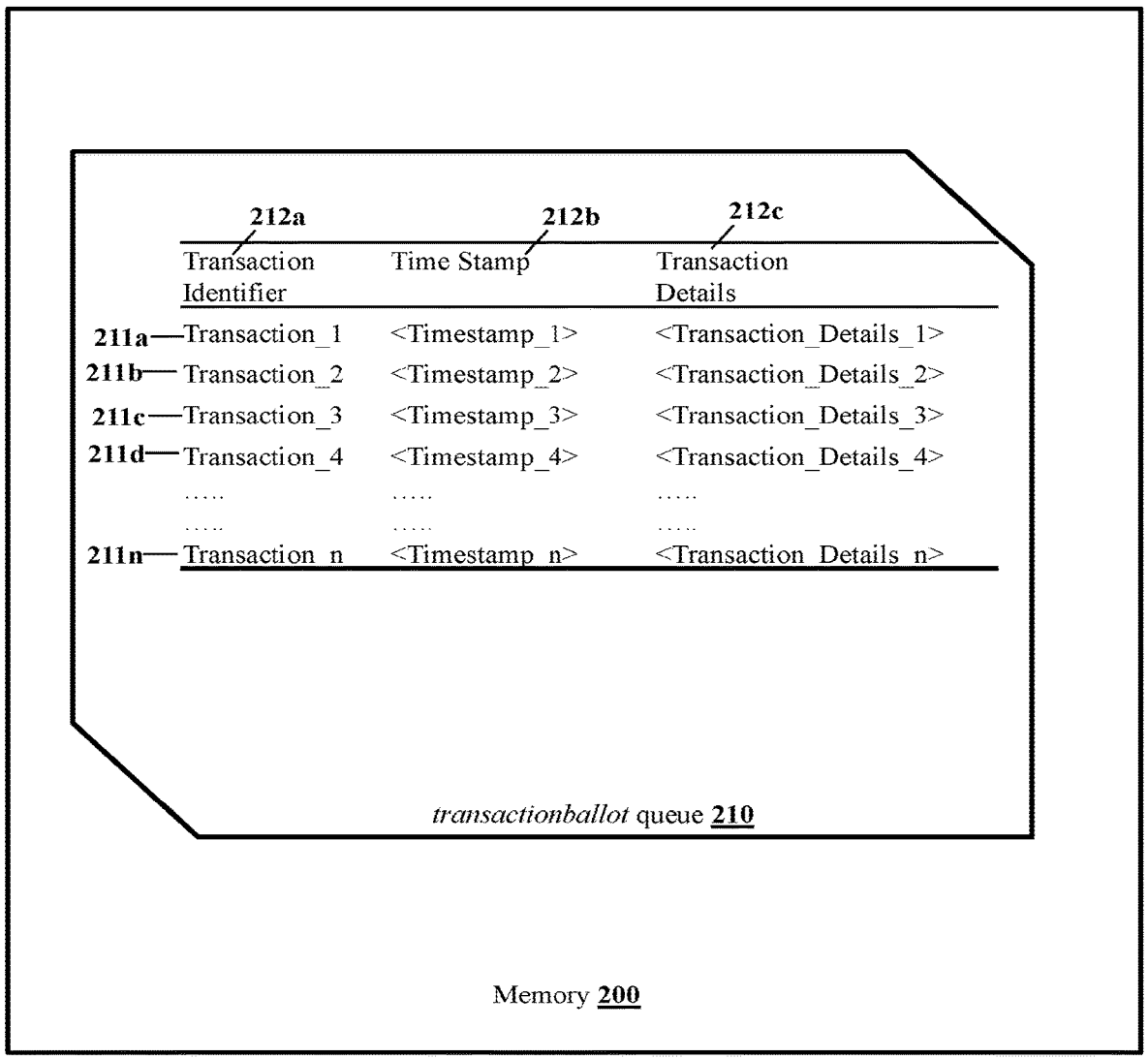
FIG. 2D shows an exemplary transactionballot queue, according to an exemplary embodiment.

FIG. 2D shows a memory 200 of an exemplary network node storing a transactionballot queue 210. The network node may use the transactionballot queue 210 during the transaction balloting process. The transactionballot queue 210 may contain a plurality of descriptors 211 of valid but unconfirmed transactions. Each of the descriptors 211 may contain a plurality of data fields 212. For instance, three exemplary data fields 212a, 212b, 212c are shown in FIG. 2D. A first data field 212a may be a transaction identifier data field, a second data field 212b may be a time stamp data field, and a third data field 212c may be a transaction data field. The network node may sort the transactionballot according to the time stamp data field.

Figure 2E:
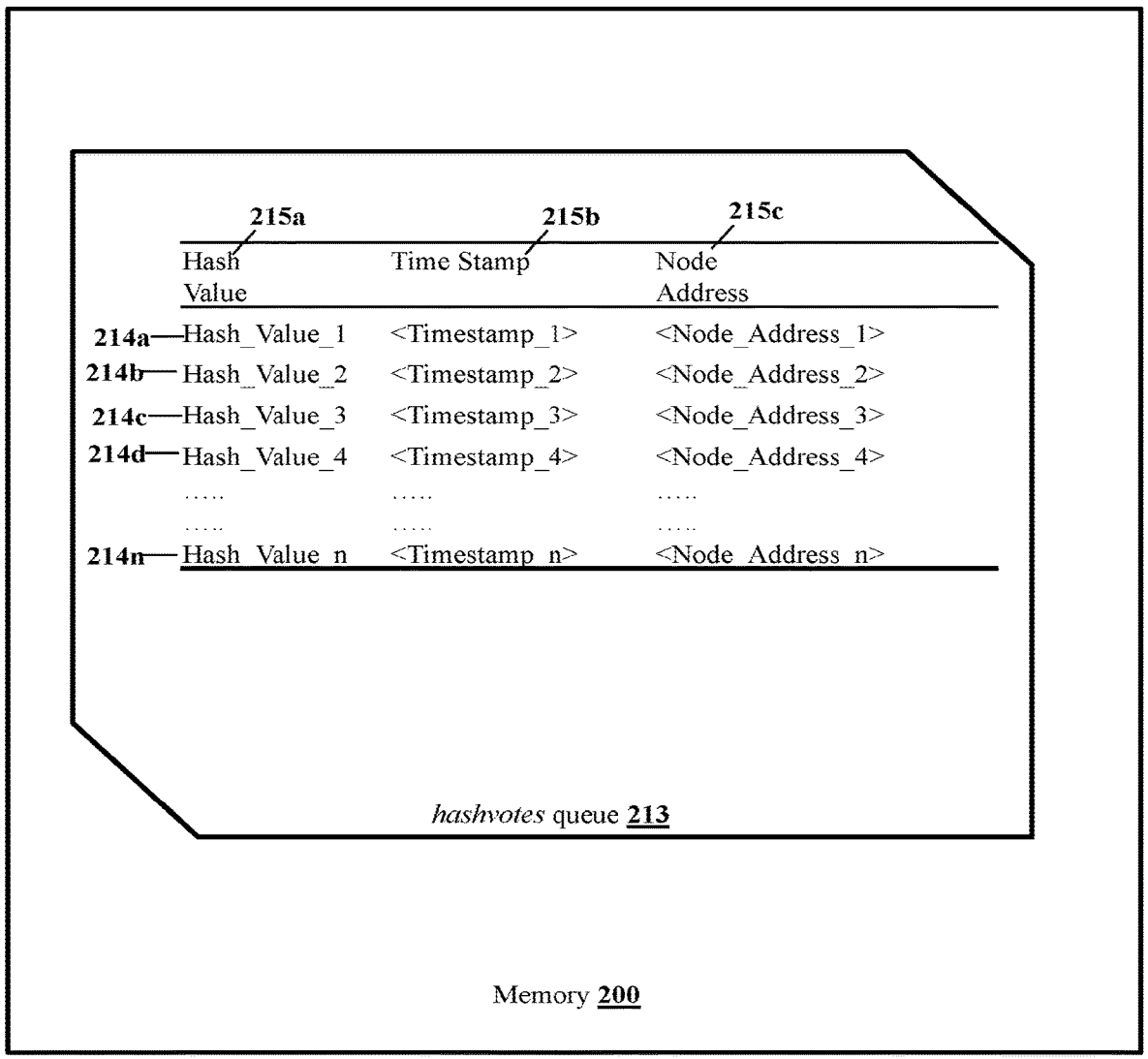
FIG. 2E shows an exemplary hashvotes queue, according to an exemplary embodiment.

FIG. 2E shows a memory 200 of an exemplary network node storing a hashvotes queue 213. The network node may use the hashvotes queue 213 during the network wide voting process to elect a winning block. The hashvotes queue 213 may contain a plurality of descriptors 214 for a plurality of hash values. Each of the descriptors 214 may contain a plurality of data fields 215. For instance three exemplary data fields 215a, 215b, 215c are shown in FIG. 2E. A first data field 215a may be a hash value data field, a second data field 215b may be a time stamp data field, and a third data field 215c may a node address data field. The hash value data field 215a may store hash value received by network node from a peer node identified in the corresponding node address field 215c. The time stamp field 215b may indicate the time the corresponding hash was generated by the peer node identified by the node address data field 215c.

One having ordinary skill in the art that the aforementioned queues are shown for illustration purposes only, and each network node may implement various types of queues and data buffers, as detailed in the methods below.

Peer Sampling Methods

The peer sampling method provides a computationally efficient process of establishing communication channels between network nodes prior to staging and conducting message exchanges between the nodes. Within the network, every node may require connected peer nodes for exchanging messages about the state of the network. However, every node may not have to exchange messages with every other node in the network to have the probability of complete information sharing among the nodes approach 1. In practice, it may not be feasible for every node to exchange messages with every other node in a large network, where nodes may regularly join and leave the network, either purposefully or due to failure, and where the network may suffer from broken or slow links, as in the case of a decentralized network, wherein independent operators may maintain various nodes. High levels of scalability, reliability, and efficiency can be achieved if each node exchanges messages with peers selected from a uniform random sample of all nodes currently in the network. However, enforcing a network wide uniform random sampling of all nodes may require that every node knows every other node in the network, which may be an unrealistic goal due to high synchronization costs incurred in a decentralized peer-to-peer network with a high churn rate (for example, individual nodes may often be connected for a few minutes to an hour). Instead, using the peer sampling method disclosed herein, each node may use a gossip protocol to construct and refresh, at each blockchain epoch, a random sampling of peers, that may be sufficient to create a probability of complete information sharing among node that approaches 1, from a localized partial view of the complete set of nodes, without having to know the complete set of nodes. The goal of the peer sampling method may to provide each node with a random subset of peer nodes from the nodes it is connected to directly or indirectly (a direct connection between two nodes may not have one or more intermediary nodes therein between and an indirect connection between the two nodes may have one or more intermediary nodes therein between).

Figure 3:
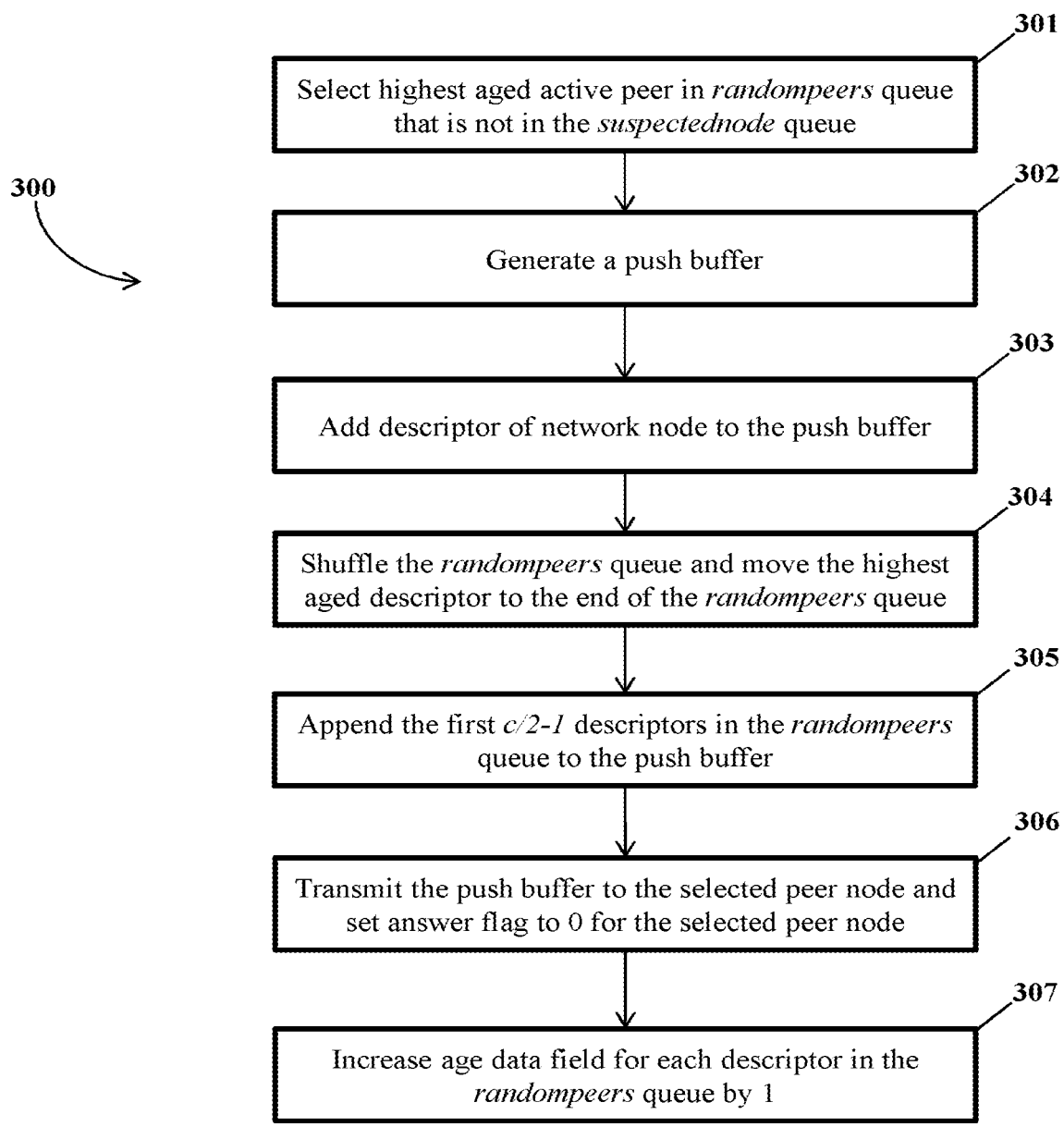
FIG. 3 shows an exemplary method for random peer sampling, according to an exemplary embodiment.

In some embodiments of the peer sampling method, a network node may not receive a pull buffer from peer nodes. In these embodiments, the network node may transmit all or a portion of its randompeers queue to a peer node such that he peer node may maintain a fresh randompeers queue. FIG. 3 shows an exemplary peer sampling method 300 implementing a randompeers queue exchange, wherein a network node transmits all or a portion of its randompeers queue to a selected peer node. Although multiple types of computers may implement the various steps of the exemplary method 300, the following description details, for brevity, a network node implementing the method 300 using a randompeers queue and a suspectednode queue, both stored in the memory of the network node. Furthermore, one having ordinary skill in the art understands that the method 300 may implement other alternative or additional steps than the one described below, and may skip one or more of the steps described below. The network node may construct and maintain entries in the randompeers queue such that the queue may contain one and only one descriptor for each peer node in the randompeers queue. Each descriptor may contain a network address for the peer node and an age that indicates the freshness of the corresponding node descriptor. The randompeers queue may have to maintain a number of node descriptors (c) such that c: O(log V) wherein V may be the number of connected nodes in the network to be an effective base for subsequent message (or information) exchange methods. Furthermore, during network start or node start, the network node may set the randompeers queue to the set of connected active peer nodes and initialize their age to 0.

In step 301, the network node may select the highest aged active peer in randompeers queue. Furthermore, the network node may query the suspectednode queue to determine whether the selected peer is in the suspectednode queue. If the selected peer is in the suspectednode queue, the network node may select the highest aged active peer in the remaining peers in the randompeers queue to transmit a portion of its randompeers queue. Once the network node has ascertained that the selected active peer is not in the suspectednode queue, the network node may execute next step 302. In step 302, the network node may generate a push buffer. In step 303, the network node may add the descriptor the network node the push buffer such that the peer node can identify the source of information. In step 304, the network node may shuffle the randompeers queue and move the highest aged descriptor to the end of the randompeers queue. For example, the network node may randomize the order of peer node descriptors in the randompeers queue while moving the highest aged descriptor to the end of the queue. In step 305, the network node may append the randomly shuffled first c/2-1 descriptors in the randompeers queue to the push buffer. In step 306, the network node may transmit the push buffer to the selected peer node and set the answer flag to 0 to the selected peer node. The answer flag set to 0 for the selected may indicate to the network node the selected node has already been sent all or a portion of randompeers queue during this blockchain epoch and no further transmission is necessary until this blockchain epoch has ended. In step 307, the network node may increase the age data field for each descriptor in the randompeers queue by 1.

Thus, at the end of the execution of the exemplary peer sampling method 300, the selected peer may receive descriptors of freshly shuffled random peer nodes from the network nodes. The selected peer may then accordingly refresh its randompeers queue based on push buffer transmitted by the network node.

Figure 4:
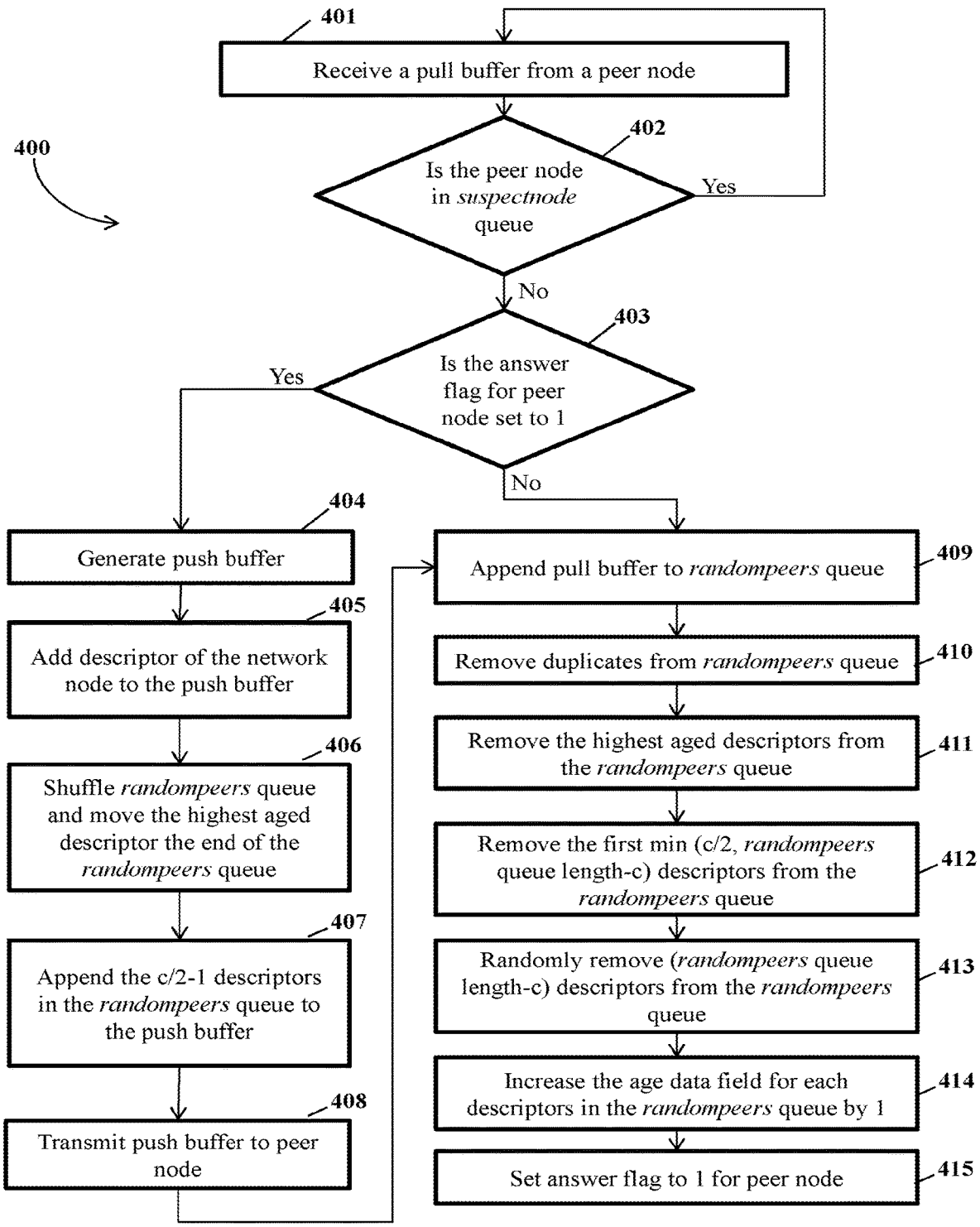
FIG. 4 shows an exemplary method for random peer sampling, according to an exemplary embodiment.

In some embodiments of the peer sampling method FIG. 4 shows an exemplary peer sampling method 400 implementing a randompeers queue exchange, according to an exemplary embodiment. Although multiple types of computers may implement the various steps of the exemplary method 400, the following description details, for brevity, a network node implementing the method 400 using a randompeers queue and a suspectednode queue, both stored in the memory of the network node. Furthermore, one having ordinary skill in the art understands that the method 400 may implement other alternative or additional steps than the one described below, and may skip one or more of the steps described below. The network node may construct and maintain entries in the randompeers queue such that the queue may contain one and only one descriptor for each peer node in the randompeers queue. Each descriptor may contain a network address for the peer node and an age that indicates the freshness of the corresponding node descriptor. The randompeers queue may have to maintain a number of node descriptors (c) such that c: O(log V) wherein V may be the number of connected nodes in the network to be an effective base for subsequent message (or information) exchange methods. Furthermore, during network start or node start, the network node may set the randompeers queue to the set of connected active peer nodes and initialize their age to 0.

The network node may execute the peer sampling method 400 once per blockchain epoch to perform a single randompeers queue exchange with a peer node. In step 401, the network node may receive a pull buffer from a peer node. The buffer may include descriptors of a plurality of nodes of the distributed network nodes maintained by the peer node within a randompeers queue within the memory of the peer node. In step 402, the network node may query the suspectednode queue using one or more data fields of the descriptor of the peer node, such as the node identifier. If the query returns a match, the network node may restart executing the method 400 for a different peer node. If the query does not return a match, the network node may execute the next step 403.

In step 403, the network node may retrieve an answer flag associated with the peer node. If the answer flag for the peer node is set to 1, the network node may determine that the network node may not have pushed its randompeers queue or a portion thereof for the current epoch to the peer node. When the network node makes this determination, the network node may execute next step 404 to generate a push buffer. The push buffer may be an empty buffer with placeholders for multiple descriptors of network nodes. In step 405, the network node may add the descriptor of itself to the push buffer. The descriptor may include the network address and the age of the network node. In step 406, the network node may shuffle its randompeers queue and move the highest age descriptor to the end the randompeers queue. For instance, the network node may shuffle the randompeers queue randomly while moving the highest descriptor to the end of the queue. In step 407, the network node may append the first c/2-1 descriptors in the randompeers queue to the push buffer. For example, if c is 32, the network node may select 15 first descriptors in randompeers and append the selected descriptors to the push buffer. The first c/2-1 descriptors may allow the peer node to keep its randompeers queue fresh. In step 408, the network node may transmit the push buffer to the peer node using one or more communication protocols.

If the network node determines in step 403 that the answer flag for the peer node is not set to 1, that is, a portion of randompeers queue has already been sent, the network node may skip the steps 404-408 and execute the step 409 and subsequent steps directly. In step 409, the network node may append the pull buffer to the randompeers queue. In step 410, the network node may remove duplicates from the randompeers queue. In step 411, the network node may remove the highest aged descriptor from the randompeers queue. In step 412, the network node may remove the first descriptors of a minimum of c/2 and randompeers queue length-c descriptors from the randompeers queue. In step 413, the network node may randomly remove randompeers queue length-c descriptors from the randompeers queue. In step 414, the network node may increase the age data field for each descriptors queue by 1. In a next step 415, the network node may set answer flag to 1 for the peer node.

Therefore, after the execution of the method 400, the randompeers queue for the network node may refreshed with a local knowledge of the network.

By implementing the exemplary peer sampling methods 300, 400 the distributed network nodes may reliably and efficiently refresh their sampling of localized peers to maintain a sufficiently randomized queue for use in subsequent message (or information) exchanges using gossiping protocols. The exemplary peer samplings methods 300, 400 may ensure randomness from each node's point of view and may provide every node with a local knowledge of the rest of the network that may allow a network convergence of global properties using only local information. Average path length may be close to that of characteristic random graphs and there may be high resilience to the fault tolerance, particularly to high churn rates. The exemplary peer sampling methods 300, 400 may set the stage for subsequent gossip based method to spread information across the network with the probability approaching 1 (i.e. network convergence or saturation). For an exemplary c of 32, the probability of saturating 4,294,899,255 nodes approaches 1.

Because the randompeers for each network node may be updated once per blockchain epoch and may accept a related information exchange from one of connected active peer once per blockchain epoch, the problem of dishonest nodes controlling any network node's randompeers queue is mitigated. In the unlikely case that two honest node collide, choosing each other to exchange information from their respective randompeers queue, the network node that receives a message first, may cease outbound information exchange during the exemplary peer sampling method 300, 400 by using the answer flag. More specifically, if the answer flag for a particular peer node is set to 1, the network node may push the randompeers queue information out to the peer node. However, if the answer flag is set to 0, the network node may cease outbound information transfer because an outbound information transfer will have already been conducted for the current blockchain epoch.

Transaction Propagation Methods

In contrast to conventional blockchains, wherein a winning node practically determines which unconfirmed validated transactions are to be processed into a block, the methods within the proof of majority method ensure that each transaction that is properly propagated and that can be validated to be processed into the nearest block possible. Furthermore, to achieve guaranteed transaction processing, the transaction propagation methods disclosed herein may ensure transaction information will be propagated to all nodes. Transaction processing may be mitigated only by catastrophic network failures, but not due to dishonest nodes and/or other attack vectors As described above, the current miner based blockchains do not provide enough incentives for competing nodes to exchange transaction information among each other. After all, each competing node wants to hold on to transactions that include fees and claim those fees by eventually creating a block that includes those respective transactions. The incentive structure enforced by the proof of majority method may rewards to nodes for collaborative participation to saturate the network with the transaction information and not to compete for nor withhold transaction information.

Figure 5:
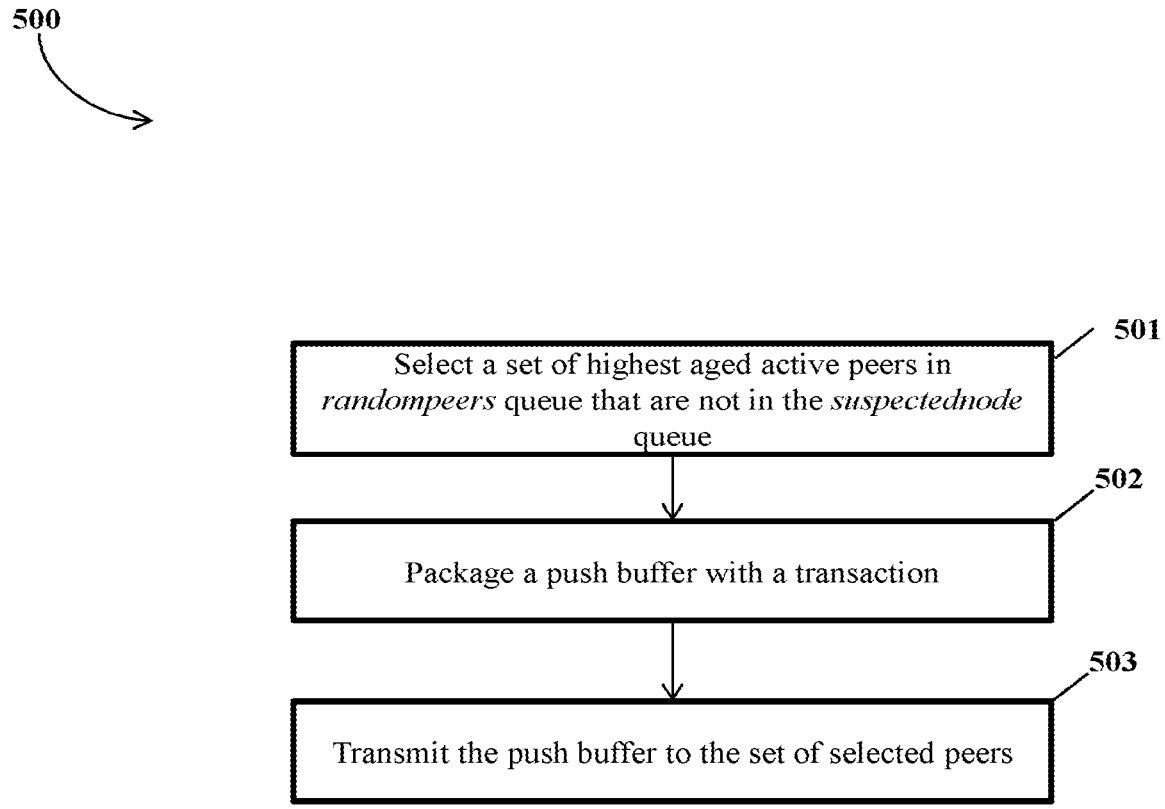
FIG. 5 shows an exemplary method transaction propagation, according to an exemplary embodiment.

FIG. 5 shows an exemplary transaction propagation method 500, wherein a network node transmits an unconfirmed transaction queue to selected peer nodes. Although multiple types of computers may implement the various steps of the exemplary method 500, the following description details, for brevity, a network node implementing the method 500 using a randompeers queue and a suspectednode queue, both stored in the memory of the network node. Furthermore, one having ordinary skill in the art understands that the method 500 may implement other alternative or additional steps than the one described below, and may skip one or more of the steps described below. In step 501, the network node may select a set of highest aged active peers in the randompeers queue that are not in the suspectednode queue. In step 502, the network node may package a push buffer with the unconfirmed transaction. In step 503, the network node may transmit the push buffer to the set of selected peers. Therefore, by executing the exemplary method 500, the network node may perform a unidirectional propagation of an unconfirmed transaction to selected peer nodes.

Figure 6:
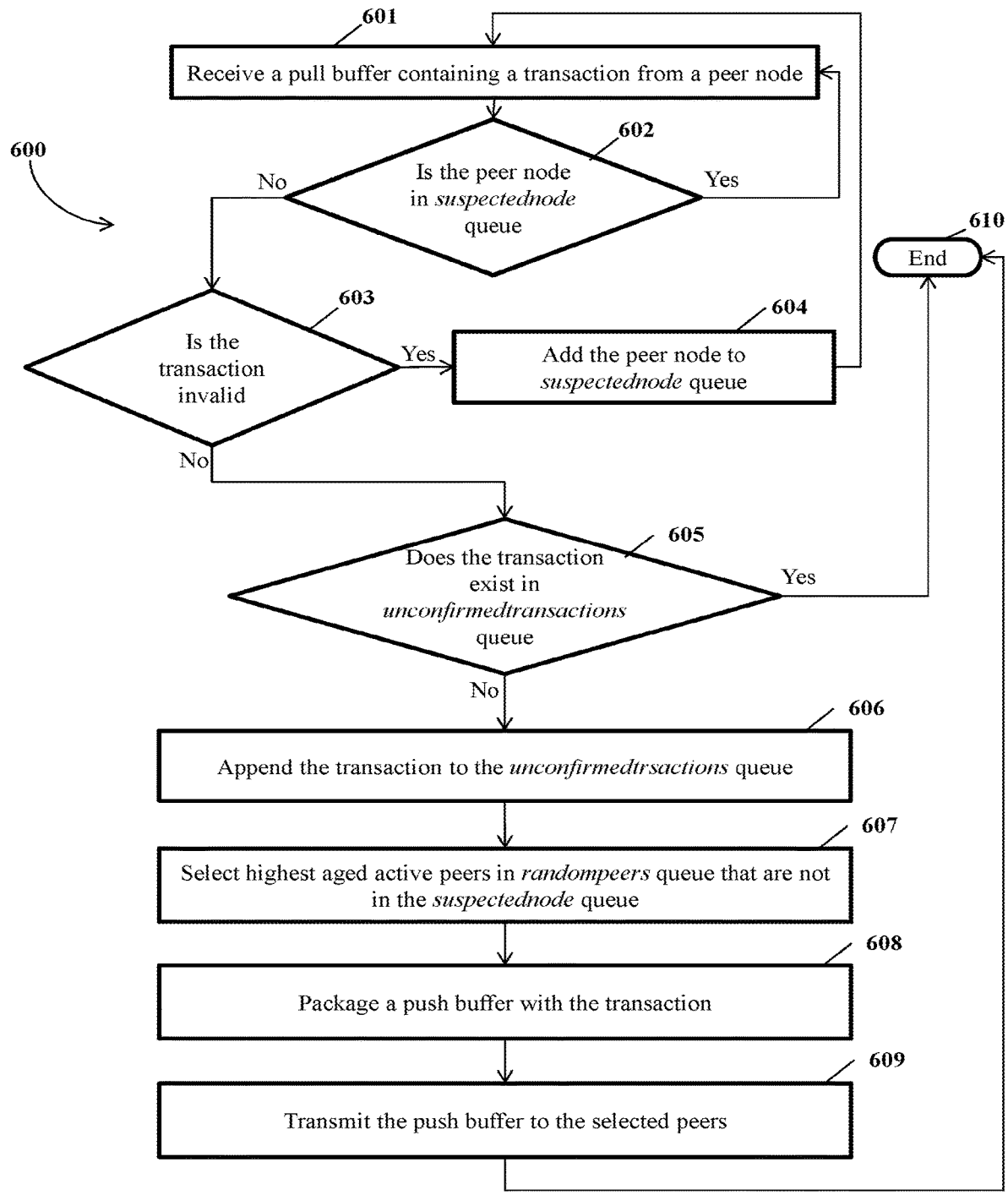
FIG. 6 shows an exemplary method for transaction propagation, according to an exemplary embodiment.

FIG. 6 shows an exemplary transaction propagation method 600, wherein a network receives an unconfirmed transaction from a peer node and transmits the unconfirmed transaction to selected peer nodes. Although multiple types of computers may implement the various steps of the exemplary method 600, the following description details, for brevity, a network node implementing the method 600 using a unconfirmedtransactions queue, a randompeers queue, and a suspectednode queue, all stored in the memory of the network node. Furthermore, one having ordinary skill in the art understands that the method 600 may implement other alternative or additional steps than the one described below, and may skip one or more of the steps described below.

In step 601, the network node may receive a pull buffer containing a transaction from a peer node. In step 602, the network node may query a suspectednode queue using an identifier of the peer node. If the query returns a match, the network node may stop the current execution cycle of the method 600 and initiate another execution cycle. If the query does not return a match the network node may execute next step 603 determine if the transaction is invalid. If the transaction is invalid, the network node may execute step 604 to add the peer node to the suspectednode queue, stop the current execution cycle of the method 600, and initiate another execution cycle. If the network node determines that the transaction is valid, the network node may execute next step 605 to query an unconfirmedtransactions queue to determine whether the transaction exist in the queue. If the network node determines that the transaction exists in the unconfirmedtransactions queue, the network node may execute step 610 to end the execution of the method 600. If the network node determines that the transaction does not exist in the unconfirmedtransactions queue, the network node may execute step 606 to append the transaction to the unconfirmedtransactions queue. In step 607, the network node may select highest age active peers in the randompeers queue that are not in the suspectednode queue. In step 608, the network node may package a push buffer with the transaction. In step 609, the network node may transmit the push buffer to the selected peers. The network node may then execute the next step 610 to end the execution of the method 600.

One having ordinary skill in the art should understand that the transaction propagation process does not require network saturation. Network saturation may rather be achieved by a subsequent transaction balloting method. Furthermore, the transaction propagation process may not have to accommodate nodes entering the network post transaction propagation: these newly entered nodes may receive the transactions during the transaction balloting process. The goal of the transaction propagation process therefore may be to mitigate the risk of a given transaction being lost or dropped by the network due to high churn rates common to decentralized peer-to-peer networks, wherein the individual nodes are often connected for only a few minutes to an hour. For instance, FIGS. 7A-7B show exemplary network states 700a, 700b during an execution of an exemplary transaction propagation processes such as 500, 600, wherein one or more nodes are either dishonest or have left the network.

Figure 7A:
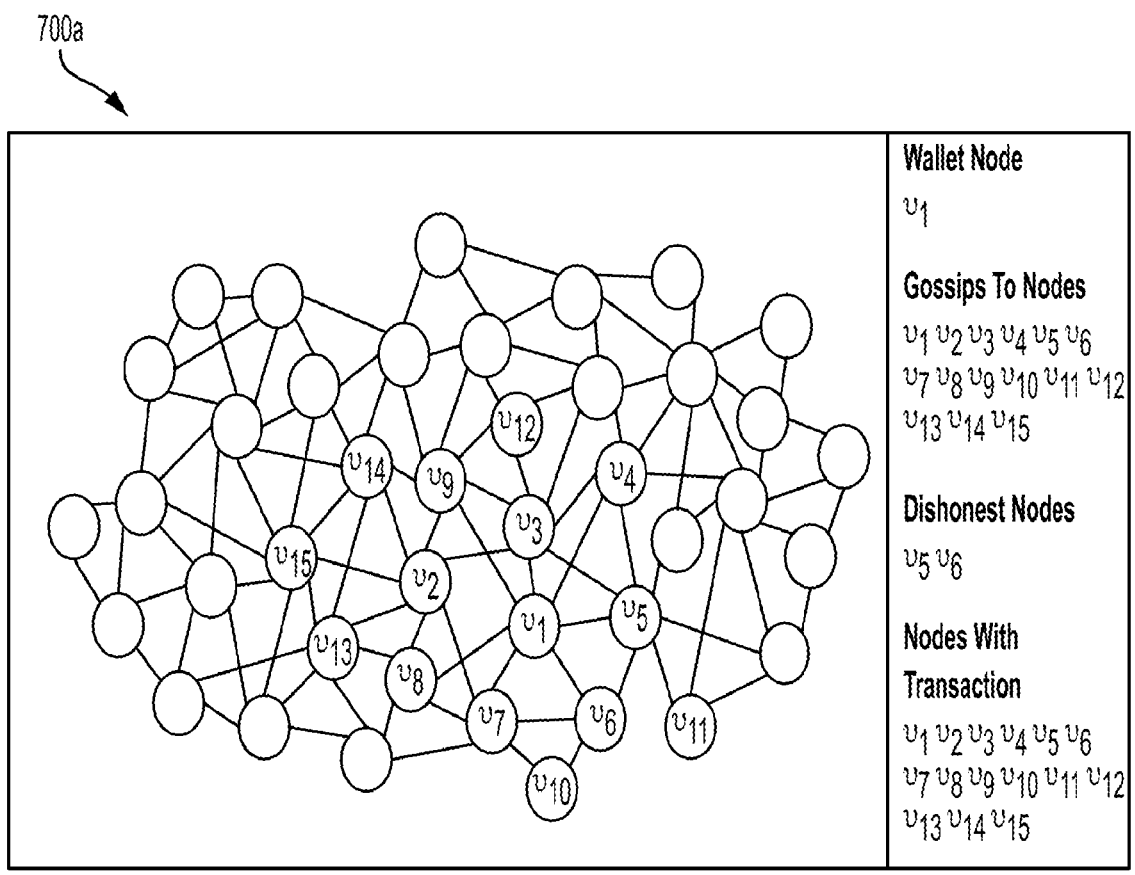
FIG. 7A shows an exemplary network state during a cycle of transaction propagation, according to an exemplary embodiment.
Figure 7B:
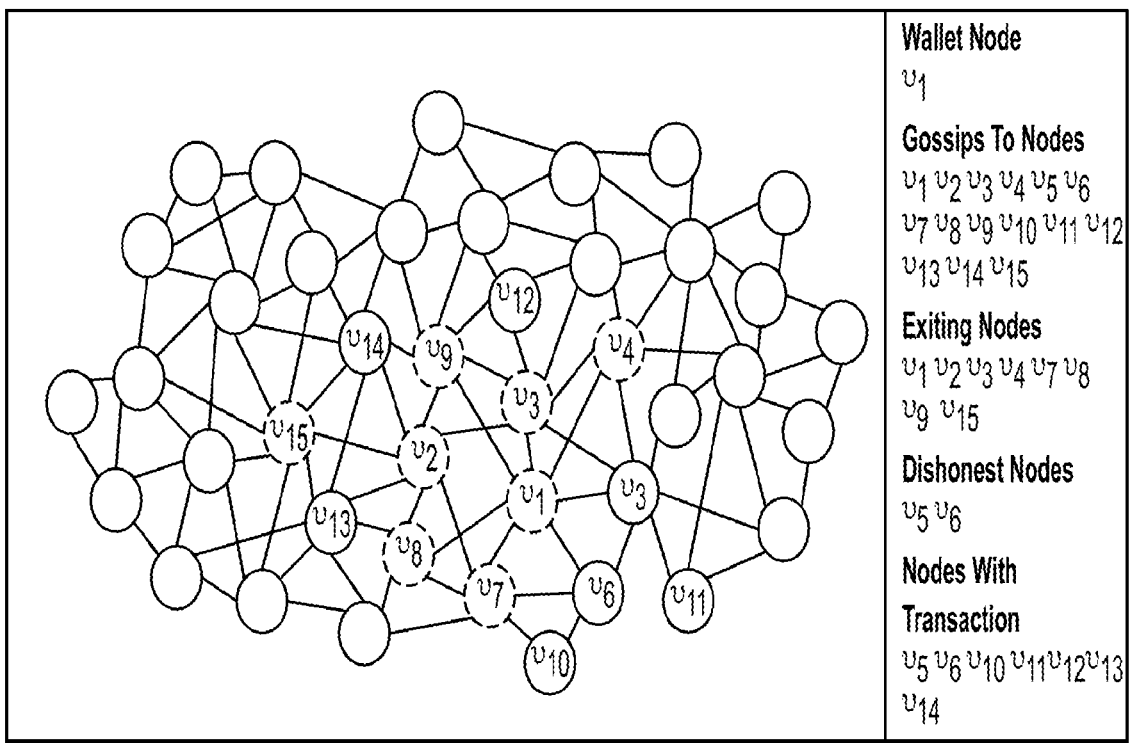
FIG. 7B shows an exemplary network state during a cycle of transaction propagation, according to an exemplary embodiment.

As shown in FIG. 7A, during a network state 700a, a wallet node $v_1$ may be asserting the transaction that the network will have to eventually include in block of a blockchain. As shown in the network state 700a, the wallet node $v_1$ may not saturate the network by transmitting the transaction information to every single node in the network. Rather, the wallet node $v_1$ may use network gossiping protocol (i.e. exemplary methods 500, 600) to transmit the transaction information to nodes $v_2 \ldots v_{15}$. One or more nodes of the receiving nodes $v_2 \ldots v_{15}$ may be dishonest nodes, such as nodes $v_5$, $v_6$ in this example. As described above, the goal of the transaction propagation process may be to preserve transaction information even in the presence of dishonest nodes and node churn while not requiring network saturation. FIG. 7B shows a second network state 700b wherein nodes $v_5$, $v_6$ may still be dishonest and nodes $v_1, v_2, v_3, v_4, v_7, v_8, v_9, v_{15}$ may have exited the network. In other words, the nodes $v_1, v_2, v_3, v_4, v_7, v_8, v_9, v_{15}$ may have effectively lost the transaction information and therefore cannot propagate the information. However, nodes $v_5$, $v_6$, $v_{10}, v_{11}, v_{12}, v_{13}, v_{14}$ still have the transaction information that may be propagated to other peer nodes.

In the aforementioned example, if the wallet node $v_1$ propagates the transaction information to fifteen highest aged peers, the probability of the transaction information reaching 32,758 networks approaches 1. To manage smaller and larger networks more efficiently, the number of peers can be adjusted without causing hard forks in the blockchain. Regardless of how many nodes are selected to propagate an unconfirmed transaction, the goal is to propagate the unconfirmed transaction to as many nodes as necessary to mitigate transactions loss due to high churn rates and to mitigate certain attack vectors, particularly that of dishonest nodes colluding to control a majority of the network. In case wherein two honest node collide, the first honest that receives an unconfirmed transaction may cease outbound transfer during the transaction propagation methods 500, 600

Transaction Balloting Method

To generate and append a block to the blockchain, the network nodes may have to form a network wide consensus about the set of transactions to be included in the block. The transaction propagation methods described above may not guarantee that all nodes receive all the propagated unconfirmed transactions. Furthermore, even if all nodes were guaranteed to receive all the unconfirmed transactions, the nodes may still need to come to a consensus on which set of transactions possibly represent the current state of the network before generating a block containing the set of transactions. Therefore prior to voting, a method to form this set of unconfirmed transactions is required. Or in other words, a method for generating a ballot of unconfirmed transactions is required prior to block generation.

Transaction balloting may be described as information synchronization of all unconfirmed transactions previously gossiped to network node that meet certain criteria. All unconfirmed validated transactions may be handled by all nodes: the transaction balloting method does not allow for discrimination. The network nodes may collectively construct a transaction ballot through peer-to-peer communication, wherein the transaction ballot is sized to allow the unconfirmed validated transaction to all fit into the next block to be generated. The network nodes may store unconfirmed validated transactions in the respective unconfirmedtransactions queues to be included in the next block in the next blockchain epoch. As detailed below, unconfirmed transactions may be validated, ordered by time stamp for inclusion in each ballot submission endorsed by each node, and propagated to peer nodes.

At this transaction balloting stage of a blockchain epoch, the task for each network may be to arrive at an ordered (by timestamps) universal set of unconfirmed transactions based on the transaction ballots endorsed by (i.e., transmitted from) by its peer nodes. The network nodes may employ an iterative process of building a universal set of unconfirmed transactions. The network nodes may iteratively propagate their respective ballots to connected peers, starting with a ballot derived from their then current understanding of the universal set of the unconfirmed validated transactions. The network nodes receiving the ballots append to their respective universal set the transactions in received ballots but not present in their respective universal set. Each node may further order the transactions by timestamps each time the respective universal set is updated. Each node may propagate the universal set to the connected peers and receive the universal sets from the connected peers. The nodes may continue this iterative process for a predetermined set of iterations, after which each node may be satisfied that it has an ordered set of unconfirmed validated transactions synchronized with the rest of the network.

Figure 8:
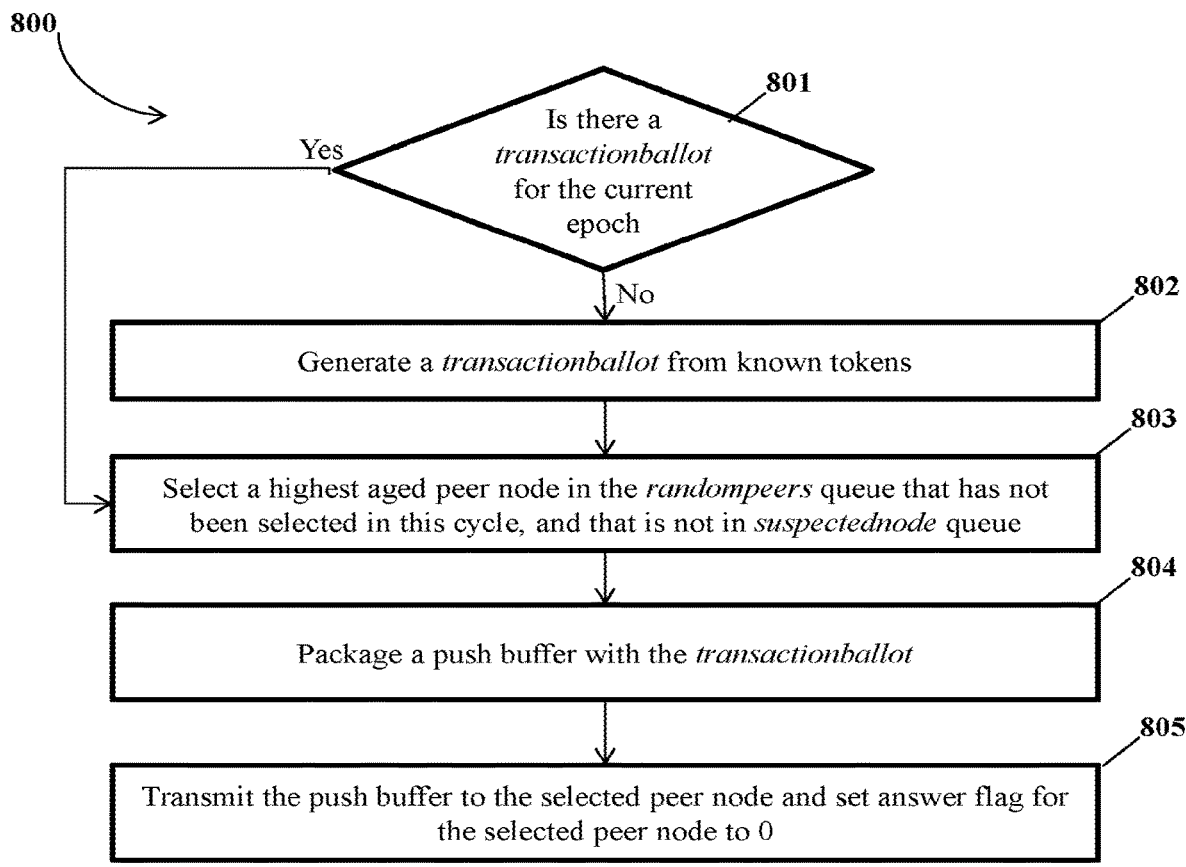
FIG. 8 shows an exemplary method for transaction balloting, according to an exemplary embodiment.

FIG. 8 shows an exemplary transaction balloting method 800, wherein a network transmits a ballot to connected peer nodes. Although multiple types of computers may implement the various steps of the exemplary method 800, the following description details, for brevity, a network node implementing the method 800 using a transactionballot, a randompeers queue, and a suspectednode queue, all stored in the memory of the network node. Furthermore, one having ordinary skill in the art understands that the method 800 may implement other alternative or additional steps than the one described below, and may skip one or more of the steps described below.

In step 801, the network node may determine if there is a transactionballot for the current epoch. If the network determines that there is no transactionballot for the current epoch, the network node may execute step 802 to generate a transactionballot from the hashes of known unconfirmed and validated tokens. However, if the network node determines that there is a transaction ballot for the current epoch, the network node may execute step 803 to select a highest aged peer in the randompeers queue that has not been selected in this cycle, and that is not in the suspectednode queue. In step 804, the network node may package a push buffer with the transactionballot. In step 805, the network node may transmit the push buffer to the selected peer node and set the answer flag for the selected peer node to 0.

Figure 9:
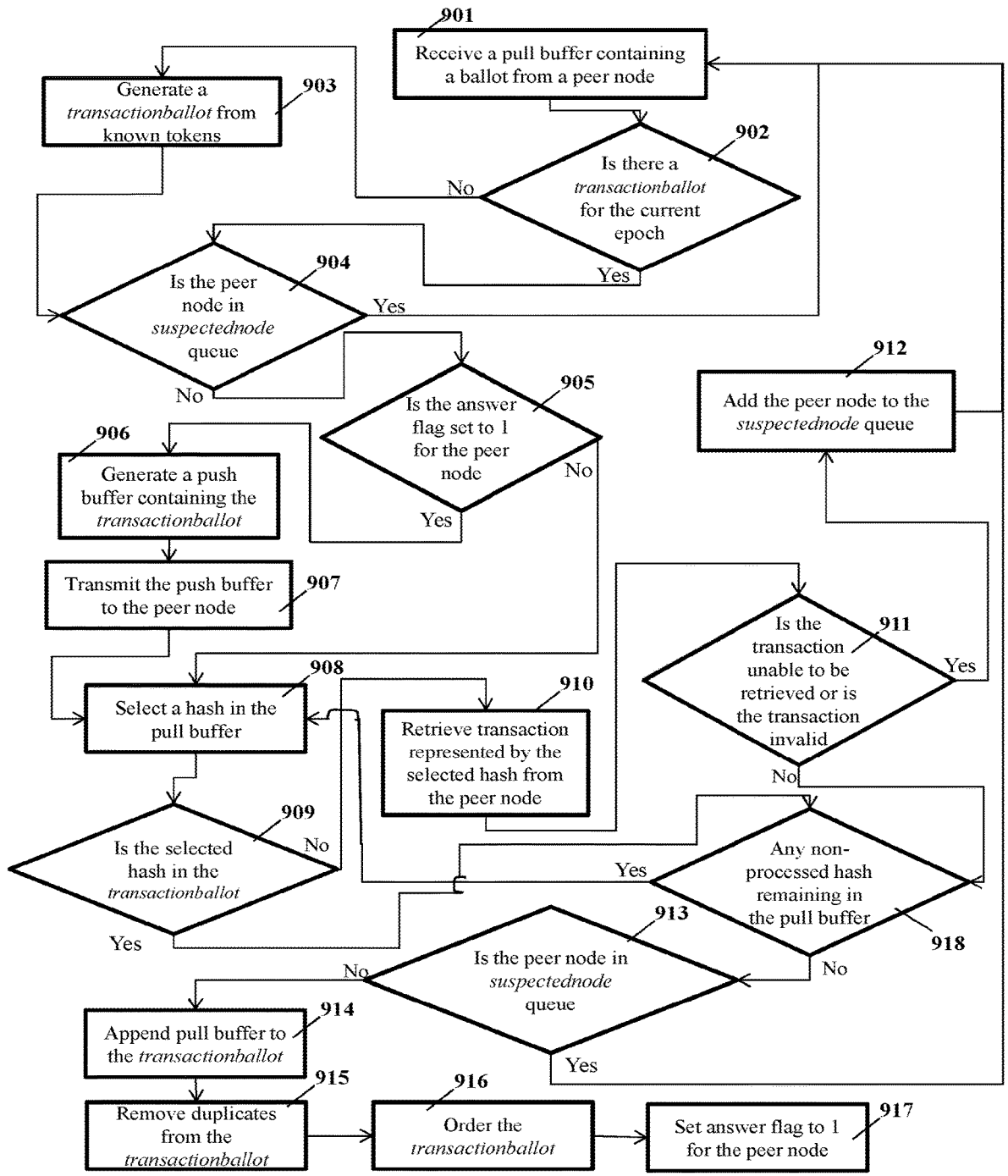
FIG. 9 shows an exemplary method for transaction balloting, according to an exemplary embodiment.

FIG. 9 shows an exemplary transaction balloting method 900, wherein a network receives a ballot from a connected peer and transmits its own ballot to the connected peer. Although multiple types of computers may implement the various steps of the exemplary method 900, the following description details, for brevity, a network node implementing the method 900 using a transactionballot, a randompeers queue, and a suspectednode queue, all stored in the memory of the network node. Furthermore, one having ordinary skill in the art understands that the method 900 may implement other alternative or additional steps than the one described below, and may skip one or more of the steps described below.

In step 901, the network node may receive a pull buffer containing a ballot from a peer node. In step 902, the network node may determine if there is a transactionballot in the network node's memory for the current epoch. If the network node determines that there is no transactionballot in its memory for the current epoch, the network node may execute step 903 to generate a transactionballot from the hashes of known unconfirmed and validated transactions stored in the memory of the network node. If however the network node determines that there is transactionballot for the current epoch, the network node may execute step 904 to determine if the peer node is in the suspectednode queue. If the network node determines that the peer node is in the suspectednode queue, the network node may stop executing the current cycle of the method 900 and initiate a new cycle. If however the network node determines that the peer node is not in the suspectednode queue, the network node may execute step 905 to determine whether the answer flag is set to 1 for the peer node. The answer flag set to 1 may indicate that the network node may not have sent its transactionballot to the peer node. Therefore, if the network node determines that the network node has not sent its transactionballot to the peer node, the network node may execute step 906 to generate a push buffer with its transactionballot and then execute step 907 to transmit the push buffer to the peer node. If the network node determines that the answer flag for the peer node is not set to 1, or that the transactionballot has already been sent to the peer node, the network node may execute step 908 to select a hash of a known unconfirmed and validated transaction in the pull buffer. Once the network node has selected the hash if the known unconfirmed and validated transaction, the network node may execute step 909 to determine if the selected hash in in the transactionballot. If the network node determines that the selected hash in not in the transactionballot, the network node may execute step 910 to retrieve the transaction represented by the selected hash from the peer node. The network node may then execute step 911 to determine whether such transaction cannot be retrieved or if the transaction is invalid. If the network node determines that either of these two conditions is fulfilled, the network node may execute step 912 to add the peer node to the suspectednode queue and then stop executing the current cycle of the method 900 and start a new cycle. If none of these conditions are fulfilled, the network node may execute step 918 to determine if there is any non-processed hashes remaining in the pull buffer. If there is a hash remaining, the network node may loop back to step 908 to select another hash in the pull buffer. The network node may then execute step 909 to determine whether the selected hash is in the transactionballot. If the network node determines that the selected hash is in the transactionballot, the network node may skip the steps 910, 911 to execute step 918 to determine whether if there is any non-processed hashes remaining in the pull buffer. In other words, the network node may execute a loop of selecting and processing the hashes in the pull buffer until all the hashes in the pull buffer are exhausted or until the peer node is designated as a suspectednode. Once the loop of selecting and processing the hashes is finished, the network node may execute step 913 to determine whether the peer node is in the suspectednode queue. If the network node determines that the network node is in the suspectednode queue, the network node may end the execution of the current cycle of the method 900 and start a new cycle. If the network node determines that the peer node is not in the suspectednode queue, the network node may execute step 914 to append the pull buffer to the transactionballot. The network node may then execute step 915 to remove duplicates from the transactionballot. The network node may then execute step 916 order the transactionballot based on the timestamps for each hash in the transactionballot. The network node may then execute step 917 to set the answer flag 1 for the peer node.

Figure 10A:
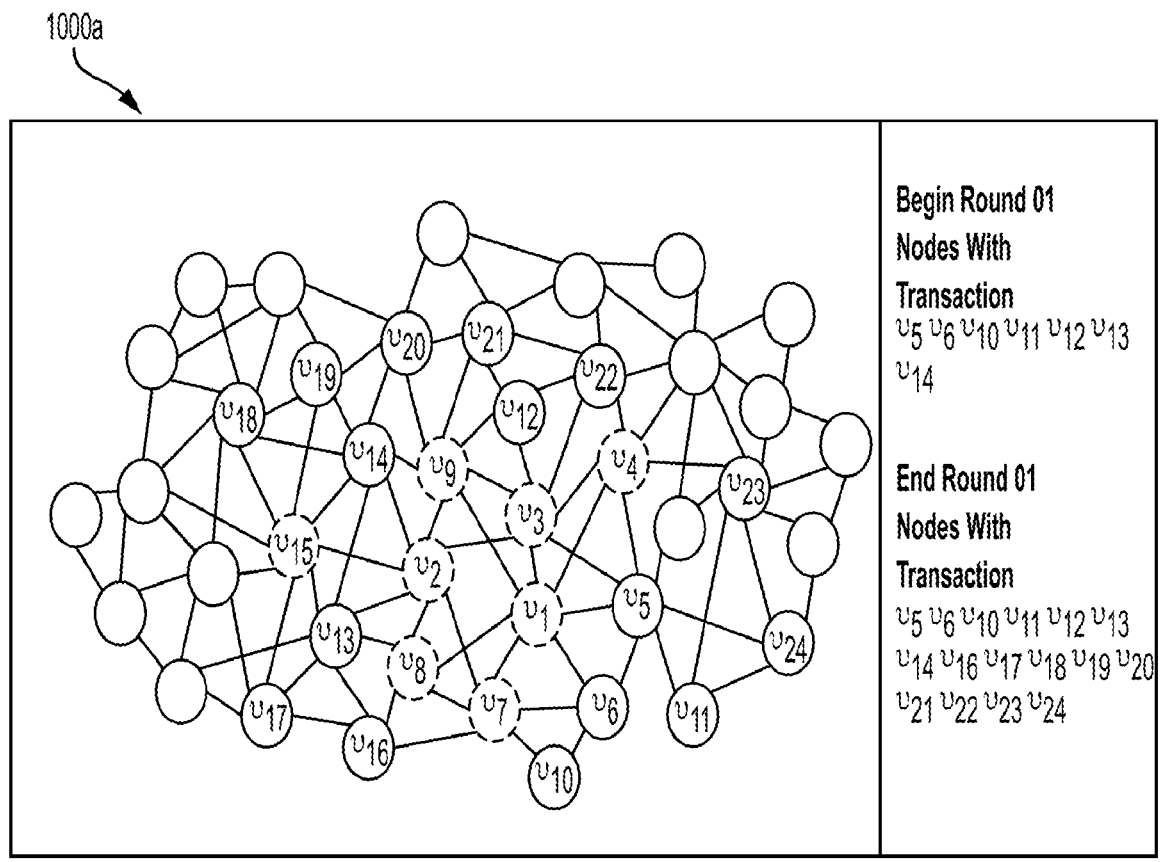
FIG. 10A shows an exemplary network state during a cycle of transaction balloting, according to an exemplary embodiment.
Figure 10B:
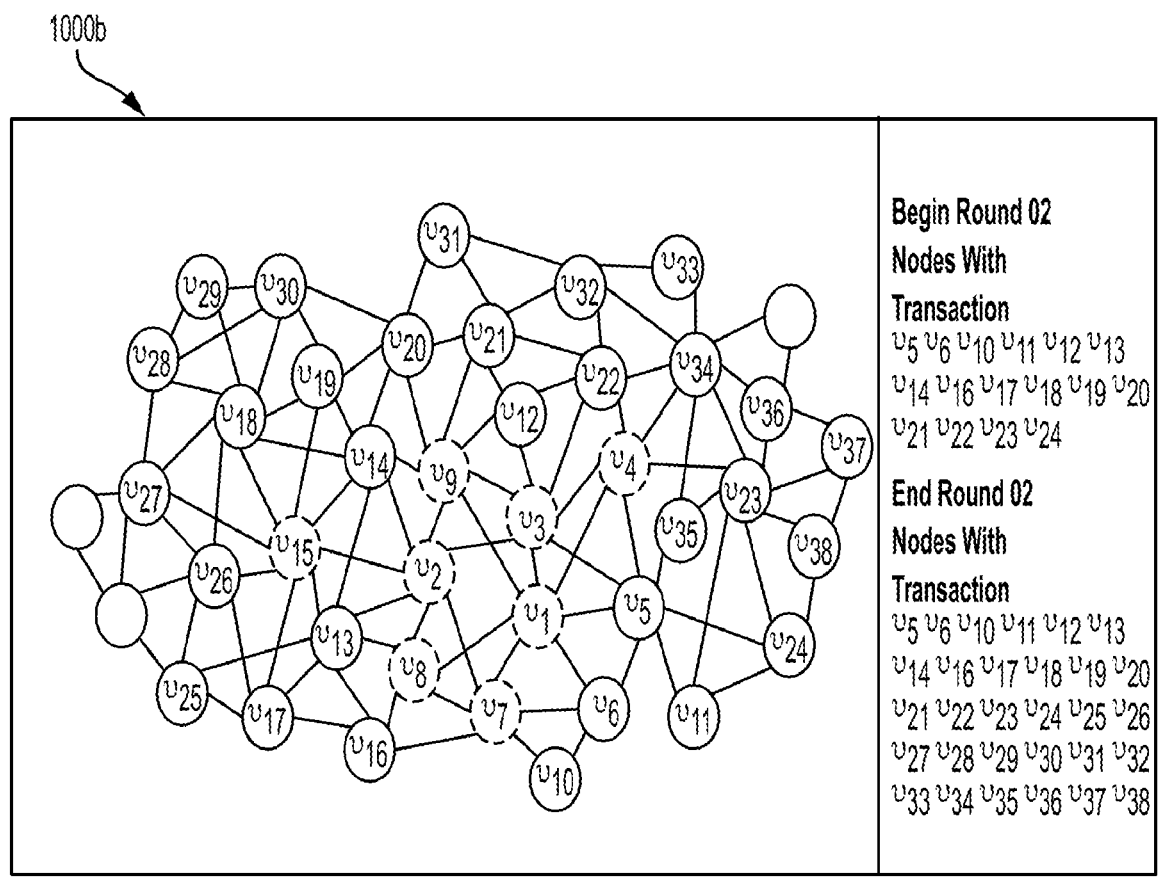
FIG. 10B shows an exemplary network state during a cycle of transaction balloting, according to an exemplary embodiment.
Figure 10C:
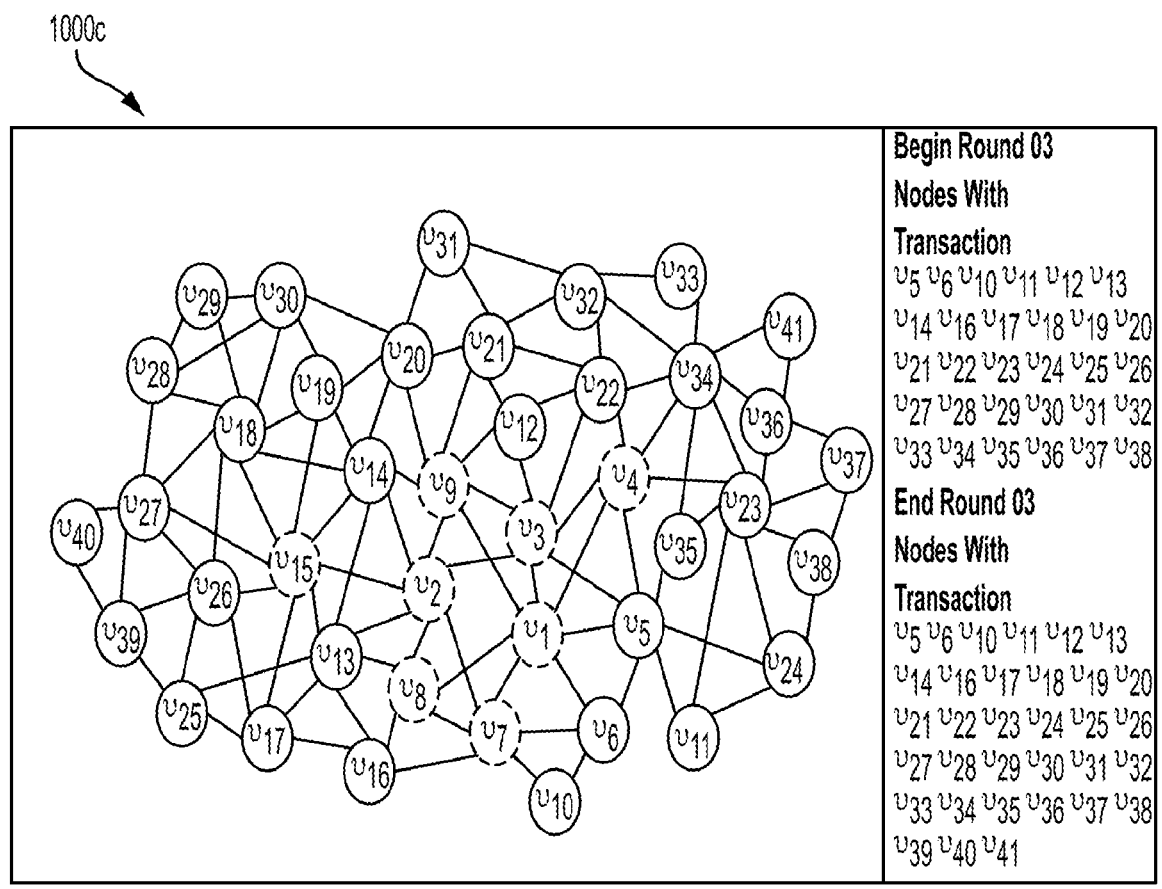
FIG. 10C shows an exemplary network state during a cycle of transaction balloting, according to an exemplary embodiment.

At the conclusion of the method 900, the probability approaches 1 that there exists a single ballot of transactions network wide. Conversely, the probability of any nodes that have a transaction ballot that is different from the aforementioned network wide single ballot of transactions approaches 0. FIGS. 10A-10C schematically illustrate network states 1000a, 1000b, 1000c during rounds (or cycles) of a transaction balloting method, such as the exemplary transaction balloting method 900 described above.

FIG. 10A schematically illustrates a network state 1000a during a first round of execution of a transaction balloting method, such as the exemplary transaction balloting methods 800, 900. Before the execution of the method, the starting state of the network may have been that peer nodes have received transaction information from wallet node $v_1$ and nodes $v_1$, $v_2$, $v_3$, $v_4$, $v_7$, $v_8$, $v_9$, $v_{15}$ may have exited the network. Furthermore nodes $v_5$, $v_6$ may be dishonest nodes and may not accurately participate in the transaction balloting method. At beginning of the first round, the nodes $v_5$, $v_6$, $v_{10}$, $v_{11}$, $v_{12}$, $v_{13}$, $v_{14}$ may have the transaction initiated by the wallet node $v_1$. At the end of the first round of transaction balloting, nodes $v_5$, $v_6$, $v_{10}$, $v_{11}$, $v_{12}$, $v_{13}$, $v_{14}$, $v_{16}$, $v_{17}$, $v_{18}$, $v_{19}$, $v_{20}$, $v_{21}$, $v_{22}$, $v_{23}$, $v_{24}$. may have the transaction information generated by the wallet node $v_1$.

FIG. 10B schematically illustrates a network state 1000b during a second round of the execution of the transaction balloting method, such as the exemplary transaction balloting methods 800, 900. As seen herein, virtually all nodes may have an accurate understanding of the transaction ballot after the second round of the execution of the transaction balloting method. More specifically, at the beginning of the second round nodes $v_5$, $v_6$, $v_{10}$, $v_{11}$, $v_{12}$, $v_{13}$, $v_{14}$, $v_{16}$, $v_{17}$, $v_{18}$, $v_{19}$, $v_{20}$, $v_{21}$, $v_{22}$, $v_{23}$, $v_{24}$ may have the transaction ballot; and, at the end of the second round nodes $v_5$, $v_6$, $v_{10}$, $v_{11}$, $v_{12}$, $v_{13}$, $v_{14}$, $v_{16}$, $v_{17}$, $v_{18}$, $v_{19}$, $v_{20}$, $v_{21}$, $v_{22}$, $v_{23}$, $v_{24}$, $v_{25}$, $v_{26}$, $v_{27}$, $v_{28}$, $v_{29}$, $v_{14}$, $v_{30}$, $v_{31}$, $v_{32}$, $v_{33}$, $v_{34}$, $v_{35}$, $v_{36}$, $v_{37}$, $v_{38}$ may have the transaction ballot.

FIG. 10C schematically illustrates a network state 1000c during a third round of the execution of the transaction balloting method, such as the exemplary transaction balloting methods 800, 900. As seen herein, the entire network has converged—i.e. all nodes in the network may now have an accurate understanding to the transaction ballot and are ready for a block creation and network wide voting protocol. More specifically, at the beginning of the third round nodes $v_5$, $v_6$, $v_1$, $v_{11}$, $v_{12}$, $v_{13}$, $v_{14}$, $v_{16}$, $v_{17}$, $v_{18}$, $v_{19}$, $v_{20}$, $v_{21}$, $v_{22}$, $v_{23}$, $v_{24}$, $v_{25}$, $v_{26}$, $v_{27}$, $v_{28}$, $v_{29}$, $v_{14}$, $v_{30}$, $v_{31}$, $v_{32}$, $v_{33}$, $v_{34}$, $v_{35}$, $v_{36}$, $v_{37}$, $v_{38}$ may have an understanding of the transaction; and, after the execution of the third round the network may have converged with the accurate understanding of the transaction ballot.

Network Wide Voting Methods

At each blockchain epoch, a majority consensus may be achieved by the network. Each network node may maintain entries in a hashvotes queue such that the queue may contain one and only one hash for a connected node representing the block that the connected node created during the given epoch. The hashvotes queue may also include a descriptor for the block creator and a timestamp.

Figure 11:
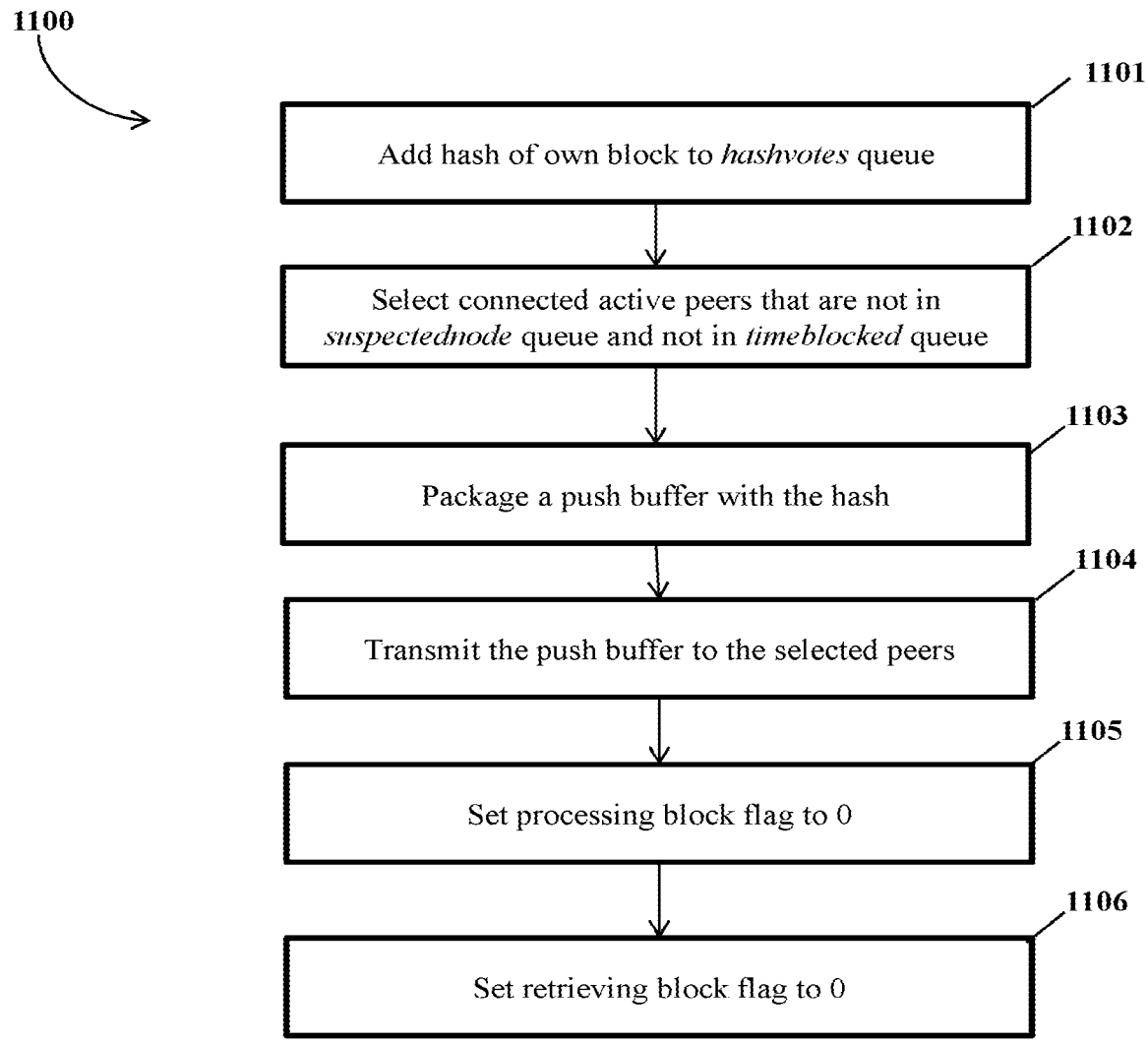
FIG. 11 shows an exemplary method for network wide voting, according to an exemplary embodiment.

FIG. 11 shows an exemplary network wide voting method 1100 for determining a winning hash. Although multiple types of computers may implement the various steps of the exemplary method 1100, the following description details, for brevity, a network node implementing the method 1100 using a hashvotes queue, a timeblocked queue, and a suspectednode queue, all stored in the memory of the network node. Furthermore, one having ordinary skill in the art understands that the method 1100 may implement other alternative or additional steps than the one described below, and may skip one or more of the steps described below.

Is step 1101, the network node may add the hash of its own block to the hashvotes queue. In other words, the network node may generate a block containing its understanding of the transaction ballot and generate a hash of a block representing the transaction ballot. In step 1102, the network node may select connected active peers that are not in the suspectednode queue and not in the timeblocked queue. In step 1103, the network node may package a push buffer with the hash. In step 1104, the network node may transmit the push buffer to the selected peers. In step 1105, the network node may set the processing block flag to 0. In step 1106, the network node may set the retrieving block flag to 0.

Figure 12:
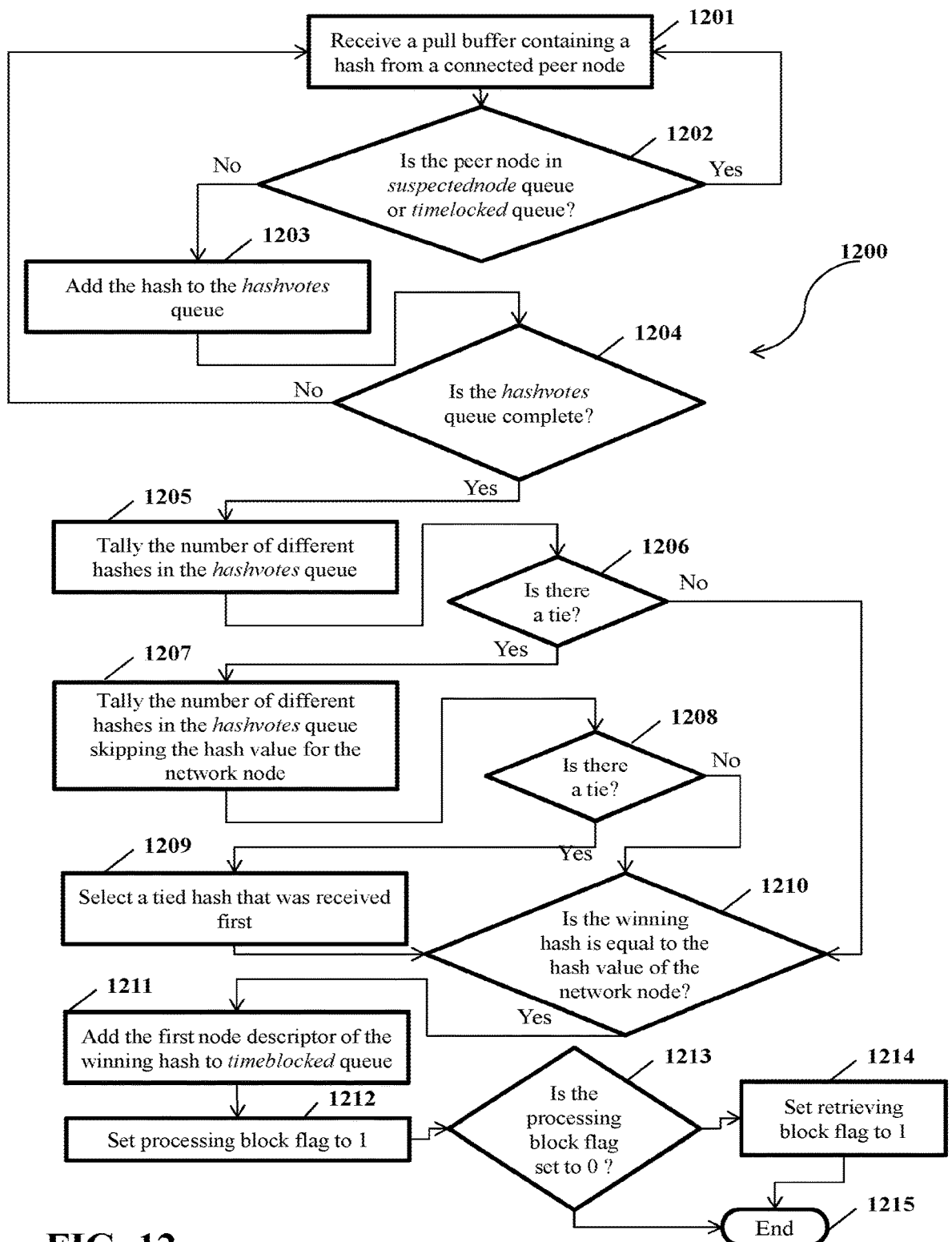
FIG. 12 shows an exemplary method for network wide voting, according to an exemplary embodiment.

FIG. 12 shows an exemplary network wide voting method 1200 for determining a winning hash. Although multiple types of computers may implement the various steps of the exemplary method 1200, the following description details, for brevity, a network node implementing the method 1200 using a hashvotes queue, a timeblocked queue and a suspectednode queue, all stored in the memory of the network node. Furthermore, one having ordinary skill in the art understands that the method 1200 may implement other alternative or additional steps than the one described below, and may skip one or more of the steps described below.

In step 1201, the network node may receive a pull buffer containing a hash from a connected peer node. In step 1202, the network node may determine if the peer node is in the suspectednode queue or the timeblocked queue. If the network node determines that the peer node is in either of these queues, the network node may revert back to step 1201 to receive another pull buffer from another peer node. However, if the network node determines that the peer node is in none of these queues, the network node in step 1203 may add the hash in the pull buffer to the hashvotes queue. In step 1204, the network node may determine if the hashvotes queue is complete. If the hashvotes queue is not complete, the network node may revert back to step 1201 to receive another pull buffer from another peer node. If the hashvotes queue is complete, the network node may execute step 1205 to tally the number of different hashes in the hashvotes queue. In step 1206, the network node may determine if there is a tie. Should there be a tie, the network node may execute step 1207 to tally the number of different hashes in the hashvotes queue skipping the hash value for the network node. However if there is no tie, the network node may skip steps 1207, 1208, 1209 and directly execute step 1210.

After executing step 1207 in case of tie to tally the number of different hashes in the hashvotes queue skipping the hash value for the network node, the network node may execute step 1208 to determine if there is still a tie. If there is tie the network node may execute step 1209 to select the tied hash that was received first. However, if there is no tie, the network node may execute skip step 1209 and execute step 1210 to determine whether the winning hash is equal to the hash value of the network node. Once the network node determines that the winning hash is equal to the hash value of the network node, the network node may execute step 1211 to add the first node descriptor of the winning hash to the timeblocked queue. In other words, the peer node that comes up with the winning block (and the hash) first is added to the timeblocked queue such the peer node is blocked from generating new blocks for a predetermined number of blockchain epochs. In step 1212, the network node may set the processing flag to 1. In step 1213, the network node may determine if the processing block flag is set to 0. If the processing flag is set to 0, the network node may set the retrieving block flag to 1 and execute step 1215 to end the execution of the method 1200. If the network node determines in step 1213 that the processing block flag is set to 0, the network node may skip the step 1214 and directly execute step 1215 to end the execution of the method 1200. After the execution of the method 1200, the network node may execute steps 1311-1313, as detailed below, to add the winning block to the blockchain.

Figure 13:
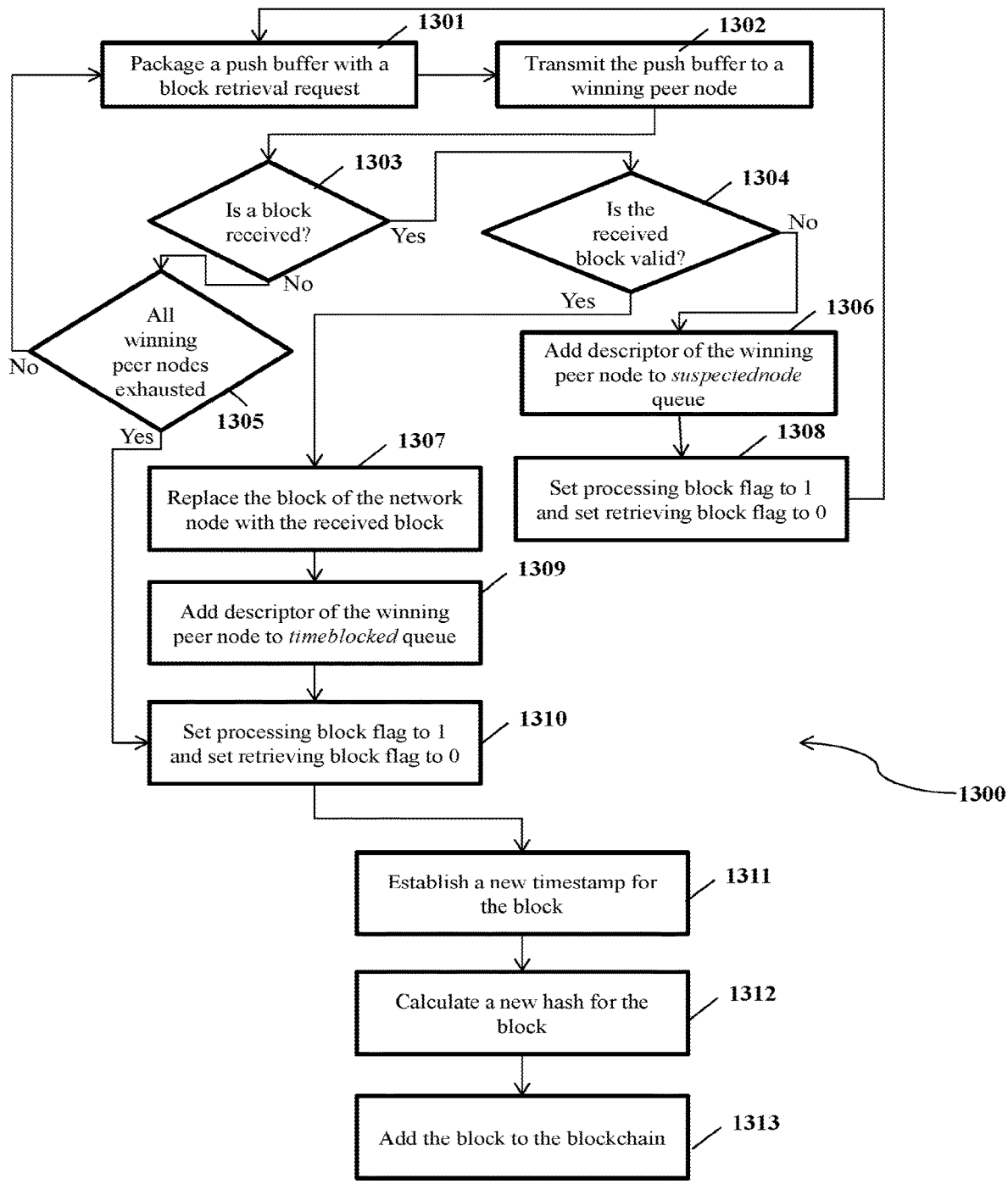
FIG. 13 shows an exemplary method for network wide voting, according to an exemplary embodiment.
Figure 14:
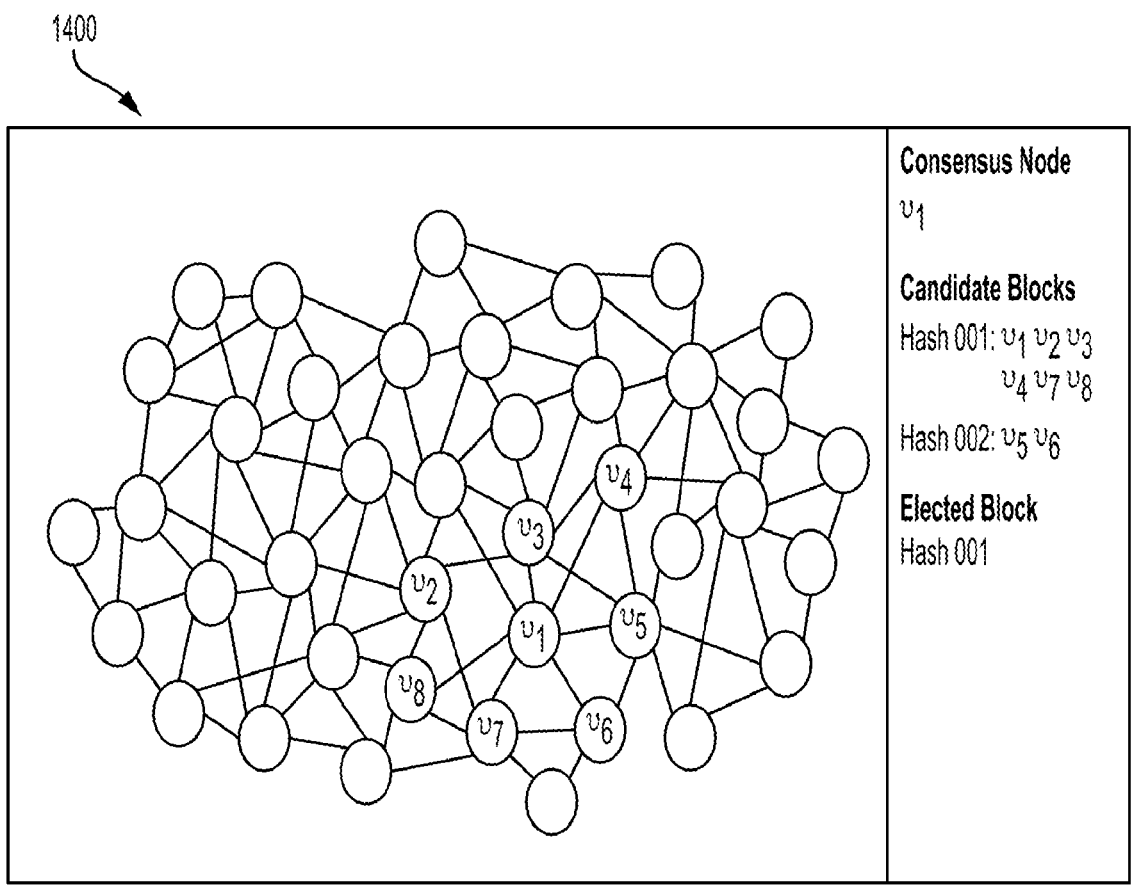
FIG. 14 shows an exemplary network state during a cycle of network wide voting, according to an exemplary embodiment.

FIG. 13 shows an exemplary method 1200 for receiving a winning block from a winning peer node. Although multiple types of computers may implement the various steps of the exemplary method 1300, the following description details, for brevity, a network node implementing the method 1300 using a timeblocked queue and a suspectednode queue, all stored in the memory of the network node. Furthermore, one having ordinary skill in the art understands that the method 1300 may implement other alternative or additional steps than the one described below, and may skip one or more of the steps described below.

In step 1301, the network node may package a push buffer with a block retrieval request. In step 1302, the network node may transmit the peer buffer to a winning peer node (i.e. the peer node that generated the winning hash). In step 1303, the network node may determine whether the requested block has been received. If the requested block has not been received, the network node may execute step 1305 to determine if all winning peer nodes have been exhausted. If all the winning peer nodes have been not been exhausted, the network node may revert back to step 1303 to generate a push buffer with a block retrieval request to another winning peer node. In other words, the network node may cycle through steps 1301, 1302, 1303, 1305 until a block has been received or until all the winning peer nodes have been exhausted without receiving the requested winning block. However, if the network node determines that a block has been received in step 1303, the network node may execute step 1304 to determine if the received block is valid. If the received block is not valid, the network node may execute step 1306 to add the descriptor of the winning peer node that sent the block to the suspectednode queue. The network node may set the processing block flag to 1 and set the retrieving block flag to 0 in step in step 1308 and revert back to step 1301 to package and subsequently transmit a push buffer with a block retrieval request to another winning peer node. However, if the received block is valid in step 1304, the network node may skip steps 1306, 1308 and execute step 1307 to replace the block of the network node with the received winning block. In step 1309, the network node may add the descriptor the winning peer node to the timeblocked queue. In step 1310, the network node may set the processing block flag to 1 and set the retrieving block flag to 0. In step 1311, the network node may establish a new timestamp for the block. In step 1312, the network node may calculate a new hash for the block. And, in step 1313, the network node may add the winning block to the blockchain.

One having ordinary skill in the art should understand that the exemplary network voting methods 1200, 1300 may build on all the nodes having an a priori knowledge of the same transaction ballot. Assuming that the aforementioned transaction balloting methods have generated a convergent network, then each network node participating in the voting methods should generate the same block (and the same hash) from the same transaction ballots. However, the probability of network convergence although approaching 1 may not quite be 1. In other words, some nodes may still have transaction ballots different from the majority of nodes. Although these nodes with different transaction ballots may deterministically generate respective blocks that accurately represent the transactions in their transaction ballots, these nodes may not participate in the consensus reached by the majority of the network nodes. These minority nodes may not necessarily be dishonest and may still add a block elected by the rest of the network nodes to their blockchains, assuming that a majority of their connected peers are honest and have started with the complete transaction ballot. If the majority of the connected peers are dishonest, a fork may occur that may eventually be abandoned.

One having ordinary skill in the art should further understand that winning hashes are not gossiped among nodes to prevent attack vectors such as dishonest nodes flooding the network with invalid hashes. As a result, the network nodes may elect blocks for the blockchain based on a majority voting consensus rather an externally disseminated vote that may not otherwise be validated in a decentralized network.

Forks and Abandonment

The proof of majority consensus methods described herein may quickly and automatically orphan and abandon forks generated by dishonest or corrupted network nodes. Because, as detailed network voting methods 1100, 1200, each network node may ignore any valid block (i.e. hash thereof) that does not confirm to the majority of valid inbound blocks from connected peers, a dishonest node may only corrupt network nodes that elect its block. To elect its block would require that the majority of the network node's connected active peers also send it the same block (i.e. hash thereof). This would require that a majority of the node's connected active peers also be dishonest or corrupted. At the next blockchain epoch, the now corrupted node may then send a block (i.e. hash thereof), based on the so corrupted blockchain, to the connected active peer nodes, which would in turn ignore the block (i.e. hash thereof) because the block is not among the majority. In other words, the fork may be effectively orphaned. Therefore, a dishonest node would have to collude with a number of other dishonest nodes to make a dishonest majority sufficient to overrun the network, which may be probabilistically impossible in the proof of majority consensus method.

Figure 15:
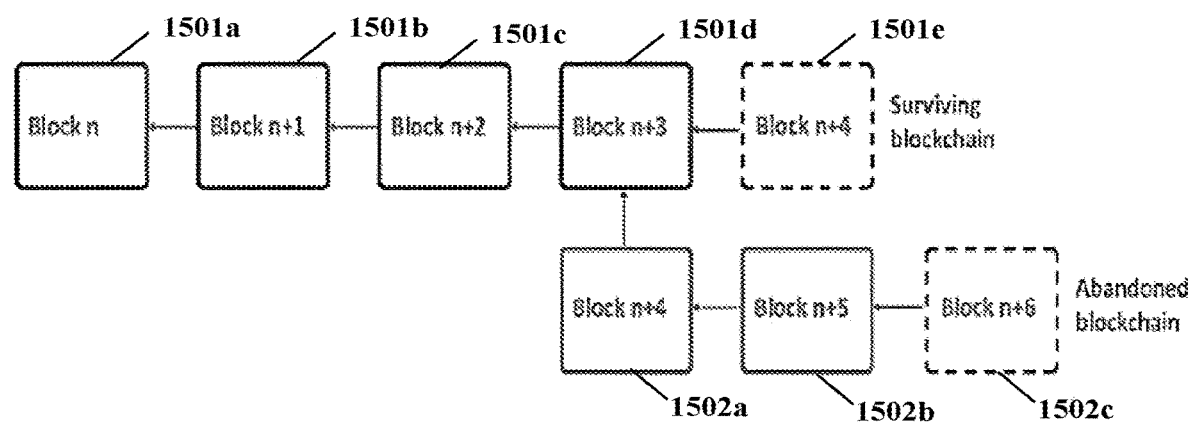
FIG. 15 shows an exemplary fork in a blockchain, according to an exemplary embodiment.

FIG. 15 shows an exemplary blockchain 1500 with valid blocks 1501 and invalid blocks 1502. The invalid blocks 1502 thereby may create a fork in the blockchain 1500. To put it differently, the valid blocks 1501 may have been generated by honest nodes and the invalid blocks 1502 may have been generated by the dishonest or corrupted nodes. Although the dishonest or corrupted nodes may be able to outpace the rest of the network in generating blocks, these blocks (i.e. hashes thereof) will not be accepted by the network because the dishonest or corrupted nodes represent less than 50% of the network. Thereby the fork generated by the invalid blocks 1502 may be quickly and automatically discarded by the network. In other words, it is probabilistically impossible for the dishonest or corrupted nodes to overrun the network.

Furthermore, the network implementing the proof of majority consensus method may be self-healing. More specifically, corrupted nodes are not removed from the network. Instead, the corrupted networks are added into the respective suspectednode queues of the nodes the corrupted nodes are connected to. Eventually, the corrupted nodes may be provided with an opportunity to re-enter active communications with the respective connected active peers. As each previously corrupted node enters active communications, it may determine that its understanding of the blockchain may differ from the network wide understanding and may seek to synchronize. Once synchronized, the previously corrupted node may participate in the subsequent blockchain epochs. Thus, attempts to corrupt nodes by dishonest nodes may have only a short-term impact on the network. In other words, the network may self-heal from any corruption introduced by dishonest nodes.

Blockchain (or Network) Epochs

The proof of majority methods may require that the blockchain epochs proceed in lockstep at all nodes in the network. This requirement may not be satisfied in large-scale distributed system, due to the unpredictability of the message delays and drift rates of local clocks. For example, in an epoch j, let $T_j$ be the time interval from when the first node starts participating in epoch j to when the last node starts participating in the same epoch. In a completely asynchronous network the length of this interval may increase without bound due to the different drift rates of local clocks and a message delay when a new node joining the network may obtain the next epoch identifier from an existing node. To avoid this problem, when a node participating in epoch i receives an exchange message tagged with epoch identifier j such that j>i, the node may stop participating in epoch i and instead starts participating in epoch j. However, because the proof majority consensus methods may saves network energy by allowing each node to build its own blockchain devoid of block gossiping, the node that stopped participating in epoch i may produce a blockchain of insufficient height. Therefore, in this scenario, all the nodes in the network may have to complete the epoch i before moving to epoch j. To put it differently, the network as a whole may complete a specific epoch only when the slowest node in the network completes that specific epoch. This is an undesirable limitation on overall network throughput. The average pace of epochs may have to be more deterministic than that of the slowest node at a given epoch. A timeout on message exchange between a node and a given connected peer may be required to set an average pace for epochs. To avoid reducing the overall number of participating honest network nodes, such timeout may have to be larger than or equal to $T_j$. Because the consensus methods may leverage push/pull communication schema, which may propagate messages between the nodes super-exponentially, and, based on the assumption that each message may arrive within a prescribed timeout during all communications, a logarithmic bound on Tj for each epoch j can be obtained. Typically many nodes will start the new epoch independently with a small difference in time, so this bound may be small, and thus an epoch length may greater than or equal to $T_j$. Thus, the time interval $T_j$ may be used as a network messaging timeout.

The end of any given epoch may be demarked by all nodes in the network completing a network wide voting method, either by being eliminated from processing due to the timeout on message exchange, as detailed above, or by receiving block election messages from all non-timed out connected peers. Because this method may require answers or timeouts from all connected peers, each node may complete the current epoch at virtually the same time within a small differential of time. Because of this situation, this consensus model may not impose a predetermined timeframe for an epoch to complete in.

To enlist the timely election of the next block onto the blockchain, each node may start the next epoch immediately. The peer sampling method is the first step in any epoch and each related message exchange may contain the epoch number of the current epoch—i.e., the height of the blockchain. If a node receives a peer sampling protocol message containing an epoch number that does not match the height of the blockchain it has on record, then the node may not participate in the current epoch and instead must synchronize its blockchain with the rest of the network. In doing so, the node may not attempt to synchronize its blockchain through message exchange with the connected peer that first reported the epoch number to it; the node synchronization method will be used in this case.

Pacing Votes and Timeblocked Queues

Nodes may be allowed to propagate blocks for peer voting as long as they are not on a peer node's timeblocked queue. Each node in the network may track the first peer node that delivered a block (or a hash thereof) that was elected onto the blockchain. That first connected node may be placed into the timeblocked queue to prevent that connected node from sending new blocks for voting for a calculated number of elected blocks. Because dishonest nodes can act like honest nodes for a period of time before embarking on dishonest behaviors, the consensus methods disclosed herein require honest nodes that act quickly to abstain from block voting for a determinant period of growth in the blockchain. Based on the processing requirements this consensus model places on nodes, most nodes may be very responsive with timing footprints driven more by internode messaging timeframes than computing timeframes. Therefore when a node is consistently electing blocks at a more rapid rate than nodes in its random peer collective, the node may be acting out-of-band—i.e., pacing that node's block voting speed may be required. Any pacing requirement may have to be large enough to mitigate a dishonest node from altering a consecutive block history. For this consensus method disclosed herein, an increase in blockchain height of 1 may be a sufficient blockchain addition before allowing a node to elect another block onto the blockchain.

Assuming that each node in the network is achieving the requisite number of connected active peers, vote pacing may result at most in $1/32$ of the network being on a timeblocked queue. In practice, $1/32$ of network being in a timeblocked queue may be unlikely, as it would require that network wide the timeblocked queues collectively contain only one instance of any given node. Because nodes by design may be members of many random peer collectives, thereby creating an unpartitioned network, this may be unlikely to occur.

Unlike nodes on the suspectednode queue, nodes on the timeblocked queue may not be ignored to prevent that node from being forced to reach a timeout state with one or more of its connected active peers during the epochs before it is removed from a timeblocked queue. Although, the timeblocked node is not allowed to exchange information, it may receive response messages reminding it that it is on a timeblocked queue—i.e., while nodes are acting honestly they may not be penalized.

Peer Aging

Before a new node is allowed to submit blocks for a network vote and before it is allowed to exchange any network state related information, the node may have to age. Aging may be marked by the number of blocks added to the blockchain since the node initiated a peer request with another node. Aging may be tracked by the node receiving the peer connect request. Aging information may not be broadcast to peer nodes nor may it be gossiped to the network at large. Peer aging, along with suspectednode and timeblocked queues may be critical components of mitigating attack vectors. These may be mechanisms ensuring that dishonest nodes must work significantly harder than the rest of the network combined to achieve majority and propagate an alternative history of the blockchain. In combination with the other methods in the disclosure, the consensus methods is hardened against attack vectors. By requiring an aging event to occur prior to accepting information exchange, the network effectively and efficiently slows new entrants from disseminating inaccurate, malicious, or otherwise malformed information that would otherwise unduly burden honest nodes, and thus compromise its honest activities.

Aging may be calculated as a factor of blockchain height growth, where the goal may be to slow node entry into the network under the assumption that the all nodes are just as likely to be dishonest and they are to be honest. The focal activity, among the many potentially dishonest activities, prevented by aging may be dishonest nodes attempting to overburden honest nodes with malicious exchanges of information—i.e., denial of service or spamming. As a result, any aging requirement may have to be large enough to mitigate a loss of processing power by an honest node due to malicious information exchanges initiated by a dishonest node. For the consensus methods in this disclosure, an increase in blockchain height of 10 may be sufficient. To sum up, before peer nodes will respond to a node requesting blockchain information, or any other information set, the requesting node may have to have an appropriate age.

Retrieving the Current Blockchain

To retrieve the current blockchain, the requesting node may send a request message to each of its connected active peers. The requesting node may receive chains of hashes from its connected peers representing the blockchain that is understood by the connected peer. The node may then verify the chain and reject it if it is found to be invalid. If a received chain is valid but deviates from a node's current chain too far in the past, such a chain is not punctual and may be rejected—i.e., if the chain deviates 40 blocks prior to the current block height. If a received chain is valid but deviates from a node's current chain too far in the future, such a chain may be rejected—i.e., if the block height minus the height of the blockchain the node understood is more than a 20% deviation from the projected blockchain height based on the time elapsed between the then current time and the timestamp of the last block on the blockchain the node has a current understanding of. A node may choose the longest chain among all the chains that it did not reject, by computing the longest valid chain that is a prefix to the majority of those chains and then by finding the longest chain in that list that contains the prefix chain. If this is the network start then the genesis block is the blockchain.

In the presence of majority posterior corruption, it may be impossible to achieve consensus on the correct historical blockchain at any given epoch without an additional trust assumption—i.e., a centralized repository of the blockchain. Because it is undesirable to add this type of trust assumption into the proof of majority consensus methods, another mechanism may be employed wherein the network can converge, even if the node requesting a blockchain history cannot. In the case where the node cannot achieve convergence with the rest of the network, the node's blockchain will represent a fork from the network blockchain and the node may quickly find itself on one or more suspectednode queues; thereby effectively being eliminated from information exchanges with connected peers until such time as it can converge with the rest of the network relative to the network wide understanding of the correct blockchain.

In this way, nodes joining or rejoining the network after a short or long period away from the network, may achieve convergence with the network regarding the correct understanding of the blockchain. If the node cannot, due to the presence of majority posterior corruption, the node may not corrupt the rest of the network and instead will find itself effectively isolated from information exchanges until such time as it can achieve convergence with the rest of the network—i.e., this is a self-healing decentralized network.

Node Startup

By design, the nodes in the network may be interconnected to form a random graph. A node attempting to enter the network may first query a set of DNS servers run by volunteer operators, which may return a random set of bootstrap nodes that are currently active in the network. The node may then send connection requests to these active nodes and may wait to meet the peer aging requirements. Once the node has met these requirements, the node may be allowed to query active nodes for the network's current understanding of the blockchain through the node synchronization protocol. It may also establish its first randompeers queue via the peer sampling protocol, from which may establishes the requisite number c of connected peers. To ensure network convergence during gossip based protocols, c may be set to 32. Each node may attempt to keep a minimum number of connections c to other active nodes open at all times. Should the number of open connections drop below c, the node may randomly select an address from its randompeers queue and attempt to establish a connection. If incoming connection requests would otherwise exceed the number of requisite open connections, the connections may not be abandoned—i.e., node can have more than c connections, but strive to have at least c connections. A node's total number of open connections is therefore likely to be higher for nodes that also accept incoming connections—i.e., not all nodes accept incoming connections as they may be behind firewalls or network address translations.

Partitions in the network connection may not actively be detected and if they occur the partitions may continue operating independently. This may cause the network wide understanding of the current state of the blockchain to diverge, creating more than one parallel and possibly incompatible transaction histories. However, without an additional trust element, it may be important that each node works to maintain its requisite number of connected active peer so as to avoid network partitions.

There may be no explicit way to leave the network. The addresses of nodes that leave the network may linger for a small period before the active nodes purge them from their known address set and stop sending them in answer to peer sampling messages. Message exchange timeouts may be the primary method employed to purge nodes that have left the network.

Node Footprint

Nodes in the network may be very light weight with an extremely low processing footprint and a very small memory footprint. Information exchanges are never much larger than the size of a single block and movement frequency may be naturally throttled at each epoch. Consensus building during the network wide voting method requires block hashes to be exchanged, not blocks. Hardware running nodes can be a fraction of the processing power required to run nodes in consensus models that require heightened levels of difficulty for node selection, because simple and quick hashing is all that is required. Network energy may be at its peak during the transaction balloting protocol when the network converges on the queue of unconfirmed transactions to be included in the next elected block; during other protocols, network energy remains very low. During this peek energy state, the network is simply gossiping transactions, which it has been found that 96% of the transactions will be smaller than 1 kB. Thus, the peak energy state of the network may substantially smaller than that of other consensus models. Node energy states peek during blockchain synchronization, which under nominal network conditions occurs once during node startup. This consensus method may make a distinction between a full node and thin node only relative to the amount of information maintained at the node and that is directly related to the node's understanding of the blockchain—i.e., full nodes maintain the full blocks, while thin nodes maintain block and transaction header information. Both full nodes and thin nodes, however, may participate in block creation and the network wide voting protocol, where thin nodes temporarily maintain full transaction information for any unconfirmed transactions gossiped during the transaction balloting protocol—i.e., once a block is elected, the thin nodes will have abandoned the full block and full transaction information set in favor of block headers and transaction headers. This means that the download and storage requirements of thin nodes scales linearly with the amount time since the network start. For validation of transactions and mitigation of certain attack vectors, there exists two different trust models between full nodes and thin nodes. Full nodes can make transaction verifications against the entire blockchain, while thin nodes must instead link transactions to a block in the blockchain, ensuring that the network accepted the transaction, but without any ability to directly verify any given transaction—i.e., thin nodes may rely on the network's self-healing characteristics to mitigate attack vectors that they cannot directly address.

Thin nodes may be connected to the rest of the network under the same protocols full nodes follow. Thus, they are connected to many active peers, instead of only one active server node, as with many other consensus models. This prevents certain attack vectors that plague thin nodes in other consensus models and helps to ensure that thin nodes fully participate in the network and are thus entitled to their share of the network's mining rewards. Because proof of majority block consensus method has such low processing and memory requirements, nodes can be run on handheld devices—i.e., smart phones or tablets have the necessary processing power, memory, and bandwidth to operate within the network in a manner in which they can earn mining rewards.

Network Traffic

Unlike the conventional blockchain system wherein an announcement protocol announces broadcasts the availability of information and wherein the nodes then decide whether or not to ask for information; the proof of majority method may use a push exchange or a push/pull exchange, wherein the nodes may be expected to accept the information, as long as that information is pushed within the guidelines of then active protocol during a given epoch. The conventional announcement protocols significantly increase latency times within the blockchain system. It has been shown that for information sets less than 1 kB, the roundtrip delay in the announcement protocol is considerable. The information added to the system to announce availability of a new datum, to then respond with a request for that new datum, and then finally to send the new datum, is considerable in ratio to the datum itself—i.e., the smaller the datum the higher the ratio of overhead to information. Coupled with the three-fold increase in the number of internode exchanges to accomplish the datum transfer, there is cost savings in the novel system described herein that sends datums directly. In other words, the proof of majority method reduces overall system latency times by avoiding the overheads of the announcement protocols.

For example, taking a data send size of 450 bytes (holding a transaction sent to a peer node), one having ordinary skill in the art can see cost savings in the proof of majority consensus method compared to the conventional blockchain systems. In conventional blockchain systems, there are overheads of an announcement message of 54 bytes and a data request message of 54 bytes. The proof of majority method may do away with these overheads by using direct messages based on push or push/pull exchanges. In this example, the cost saving in the proof of majority method is therefore:

$$\frac{(54+54)[\text{Savings due lack of overhead}]]}{(54+54+450)[\text{Baseline of conventional } blockchain \text{ systems}]} \times 100\% = 19.35\%$$

Furthermore, it has been found that 96% of all transactions on blockchains are smaller than 1 kB, one having ordinary in the skill the art can observe that this saving percentage may be constant throughout the life of the network.

One having ordinary skill in the art should also understand and appreciate that in the proof of majority method, the network nodes do not gossip blocks, thereby preventing huge amounts of data from being propagated at each epoch. Instead, in the proof of majority method, each network node may arrive at a block on its own and may wait for a majority of peers to emerge and elect that block as the next block. Only in the event an honest node does not have the block that is elected by the majority of nodes, the honest node may request the elected block from a connected active peer. Therefore, while implementing different methods within an epoch to converge the network, the network nodes do not broadcast or gossip blocks; but the hashes of those blocks. Thus, the cost savings on network traffic over conventional blockchain systems may approach 100%.

To achieve information saturation across the network, in a push/pull exchange model, requires O (log log V) messages wherein V is the number of connected nodes, assuming that complete saturation is required for the protocol in question. However, in the aforementioned methods, only the transaction balloting method may require a complete saturation. Other methods may not require a complete saturation. For example, the network voting method may not require a complete saturation to achieve the necessary network convergence. The transaction propagation method uses a push exchange model that may require O (log V) messages to achieve complete information across the network, wherein V is the number of connected nodes. The transaction propagation method may also not require complete saturation to achieve the necessary network convergence. To sum up, because the proof of majority consensus method does not require complete saturation for all protocols during a given epoch, network traffic is bounded by O (log V), but rarely meets that bound.

Block Creation

The majority consensus methods in the disclosure may dictate that nodes create blocks devoid of a coinbase transaction, found in traditional consensus models, and include all transactions received during the transaction balloting. There may be no fees built into any transactions and thus inclusion of any given transaction into a block may be frictionless. Miners are not incented at the transaction level to mine, instead through the voting rewards protocol, miners receive compensation and may be incented to act rationally and honestly. Blocks may also be devoid of the typical bits field reflecting the current difficulty and are devoid of the typical nonce field—i.e., block creation is simply a matter of hashing the balloted transactions into a block while addressing the previous block's hash. Resource requirements for block creation therefore may be very small.

Nodes may generate a single candidate block per epoch and propagate that block's hash, not the block, during the network wide voting protocol. Information exchange is therefore significantly reduced compared to traditional consensus models. Because each node may eventually select among the candidate hashes of blocks, it receives during the network wide voting method, for election onto its understanding of the blockchain, rather than receiving a block via broadcasting or gossiping from the network, the node may have to generate a time stamp for its elected block that will converge across the network. Because a time stamp will be generated after election, there is no need for nodes to include a time stamp during block creation. Therefore, the time stamp field in the block header may be set to 0 seconds from 1970-01-01 00:00. Once a block is elected and a convergent time stamp is set in the block header, the electing node may rehash the block and may add it to its understanding of the blockchain.

When limits are imposed on block size, nodes will place the newest transactions, by transaction time stamp, from the transaction balloting protocol that won't fit into the block's prescribed size limit, back onto the unconfirmedtransactions queue for processing at the next epoch.

Block Time Stamping

Blocks may be created and voted on within a connected peer group and although the network converges on the included transactions through transaction balloting prior to block creation, blocks may not have time stamps that have converged. Thus, a mechanism that ensures all blocks across the various blockchain copies on the network, may have to be leveraged, if time stamps are to converge, as well. After block election during the network wide voting protocol, each node may establish the elected block's time stamp, such that; (1) the time stamp assigned to the block is the time stamp of the first transaction contained in the block, (2) if the time stamp of the first transaction in the block is at or prior to the time stamp elected in the last epoch, then the time stamp for the newly elected block is the difference between the time stamp from the block 5 epochs ago and the time stamp of the block 11 epochs ago, plus the median time stamp, in seconds, of the last 11 blocks. In this way, the consensus method of this disclosure, may ensure that block time stamps are ordered, that under nominal operating conditions, block time stamps represent the first transaction in the block, and that block time stamps may converge across the network.

Voting Rewards

Transaction processing in a peer-to-peer network consumes resources and node operators within the network may have to be compensated for this consumption. However, the consensus method disclosed herein may be frictionless, in that migrating a transaction from an unconfirmed state to a confirmed state is devoid of a fee. Node operators may be compensated for participating in the election of new blocks to the blockchain by building blocks and submitting the hashes of the blocks to their connected peer nodes for voting. Blocks may not themselves contain any fee related transactions either. Instead, voting participation is tracked and participating node operators are periodically compensated through rewards to their wallet from revenues generated by the entire network ecosystem.

Voting participation may be reported on the blockchain through heartbeat transactions. Each node in the network may track voting connected peers during the network wide voting method, by maintaining a participatingnodes queue of nodes that participated in a majority elected block. Each time a connected peer exchanges an elected hash with a node, that node increments a counter for the connect peer. This queue may not be broadcast or otherwise gossiped to any other node. At each epoch, the node may uniformly randomly select a single connected peer from its internal participatingnodes queue, where the connected peer may have a count of 2016 or more—i.e., the node may have to have more than intermittent participation during the period. The node may then place a transaction into the transaction balloting method that reflects the connect peer p and itself v. It may then reset the incremented counter for p in its participatingnodes queue—i.e., it will gossip a heartbeat transaction for the connect peer. As other nodes in the network receive the information during the transaction balloting method, they may validate the heartbeat transaction, such that; (1) p is not already in the transaction balloting queue, where duplicates are eliminated by keeping the first transaction ordered by the hash associated with v, (2) there is a heartbeat transaction for v in the last 2016 blocks of the blockchain just prior to the current epoch, and (3) there is no heartbeat transaction for v in the blockchain in the last 2016 blocks, just prior to the current epoch. If the blockchain is less than 2016 blocks in height, then requirement that there is a heartbeat transaction for v in the proceeding 2016 blocks may be waived and the threshold for required vote participation is 1 block before a heartbeat transaction can be placed into the transaction balloting protocol.

A pro-rata distribution of a total network wide reward r may be delivered periodically based on the nodes who have at least one heartbeat transaction on the blockchain—i.e., any given node with $\varphi$ heartbeats, in a network of a heartbeats, may receive a portion $\alpha$ of for that period $\tau$ such that: $\alpha_\tau:(r_\tau/\sigma_\tau)*\varphi_\tau$. As long as the cost associated with mining is less than the reward for participation, rational nodes may continue to participate. Further, because nodes are dependent on their selection by a connected peer node to report heartbeat transactions on their behalf, and this selection is through a uniform random selection process, nodes may be further incented to establish and maintain as many active peer connections as possible, increasing network interconnectivity and thereby reducing the probability of network partitioning and certain attack vectors. Additionally, the requirement that nodes sponsoring heartbeat transactions must also have had a node sponsor their heartbeat transaction, may mitigate the risk of dishonest nodes simply placing themselves on the network and propagating heartbeat transactions for each other.

Energy and Latency

At the conclusion of the epoch, all network nodes may have independently established the next block in the blockchain containing the same set of transactions. Because there is a probability approaching 1 that the blocks are created from the same base of transactions, each node may create the same block devoid of dishonest nodes. Further, each node completed processing following using the above described methods without the need to retrieve an actual block from a connected peer, with a probability approaching 1, as well. Therefore, network traffic may be kept low, while arriving at a majority consensus. Overall network energy may significantly be reduced in comparison to conventional blockchain implementations, while consensus is arrived at significantly faster and is hardened against attack vectors.

Attack Vectors

Message gossiping may be major contributor to a network's vulnerability to most attack vectors. It has the potential to increase network traffic significantly thereby increasing network energy significantly. Dishonest nodes cannot easily spam a network where honest nodes do not gossip. This consensus model depends on certain protocols exchanging information via gossip, so certain precautions have to be taken to mitigate attack vectors. To increase their chances of disrupting the network, dishonest nodes must establish more connections with the network by increasing peer-to-peer connections and/or by establishing more dishonest nodes. Because of the aging requirements, trust requirements, and internal queues that sequester bad behavior and slow even positive behavior, in this consensus model, dishonest nodes are materially slowed in their efforts to establish more peer-to-peer connections and to establish more dishonest nodes on the network. Over time dishonest nodes could permeate a network, if aging were the only factor in determining trust. Therefore, acting like an honest node is the key to continued network inclusion. Once a node determines that a connected node is acting dishonestly, the dishonest node may be ignored via placement on the suspectednode queue. There is a very low threshold for dishonesty in this consensus model. Even under nominal network conditions, devoid of dishonest nodes, it has already been shown that, as much as, $\frac{1}{32}$ of the entire network node base may be time blocked though these nodes are behaving honestly. Thus, the network is constantly throttling node participation, without hindering overall network productivity, to mitigate attack vectors.

Aside from dishonest nodes attempting to overwhelm a network to inject illegal information, there are several attack vectors that a decentralized, democratized, network computer must defend against. Most attack vectors are successful because computing or information is not truly decentralized and not truly democratized. Traditional consensus models don't actually possess either of these qualities. Under most existing and operational consensus models, mining pools are massive and controlled by very few people. Though there are almost 10,000 nodes on the most popular blockchain today, almost no mining is done outside the 8-14 largest mining pools; this is not decentralization. Further, a single node wins the "lottery" or is chosen by some algorithm as the authority allowed to submit the next block for validation; this is not a democracy. Instead, these models create single points of failure and will always be open to some new attack. Further, the lack of traffic encryption between nodes further exacerbates the problem of mitigating attack vectors. The proof of majority method is truly decentralized, democratized, and all internode communications are encrypted—i.e., this consensus model method successfully defend against known attack vectors.

Mitigation against certain attack vectors is achieved through the use of node specific queues for timeblocking honest nodes to pace their voting rates and placing nodes suspected of dishonest behavior on suspectednode queues, where all traffic from such nodes is ignored—i.e., nodes acting honestly are throttled assuming they will one day act dishonestly, while nodes acting dishonestly may be immediately sequestered.

Double Spending Problem

Conventional blockchain technologies are inherently vulnerable to double spending attacks conducted at a very low cost to the attacker. Some can be mitigated or, at least, detected by, establishing a longer detection period; some cannot be mitigated this way. Information eclipsing is the primary door to successful double spending, especially in fast payment solutions. The proof of majority consensus method is not open to the current double spending attack vectors, in that it does not present an opportunity for dishonest nodes to carry out the primary vectors, as detailed below.

Race Attack:

(Definition: Sending two conflicting transactions in rapid succession into the network.) Because, at each epoch, this consensus method requires the network to converge on the queue of unconfirmed transactions to include in the next block, the network is not open to a single node being selected for block creation wherein the node arbitrarily selects the transactions it will include in the next block. Instead, all nodes create and come to consensus on the next block with the same total queue of unconfirmed transactions. Conflicting transactions may be detected and found invalid, thus excluding the double spend of this type from the next block and blocks in the future.

Finney Attack:

(Definition: Pre-mine one transaction into a block and spend the same coins before releasing the block to invalidate that transaction.) This vector requires a consensus model in which a single node is selected for block creation. That node can introduce a block onto the blockchain that then invalidates the original spend. This is not the case with the proof of majority consensus method—i.e., all nodes create the next block and come to consensus electing that block into the blockchain, so no single node has enough power to affect this type of double spend.

51% Attack:

(Definition: Usurp over 50% of the total computing power of the network to control which transactions appear in blocks including the ability to reverse transactions.) As detailed throughout this disclosure, it is probabilistically almost impossible to mount this attack in the proof of majority block consensus method.

Mitigating Sybil Attacks

In decentralized network where inclusion in peer groups is open, a Sybil attack may be possible. The possibility for a node to inject itself into the network and subvert a positive reputation by forging its identity to match that of a node that exited the network with a positive reputation, is an attack vector that may have to be mitigated. Encrypting information exchanges between connected peers helps to mitigate this risk, thereby requiring a dishonest node to somehow acquire a private encryption key held by the node it is impersonating. The push/pull information exchange protocols further mitigate this vector, by leveraging the fact that although it is easy to spoof an IP return address in an IP packet, it is not easy to subvert routing and receive messages on a spoofed IP address. A dishonest node is thus limited by the number of public IP addresses that it actually has control over. Proof of majority block consensus method also may require that peers use TLS connections with endpoints identified by IP address, thereby further reducing the risk of this vector's success.

Mitigating Denial of Service and Spamming

The goal of the dishonest node or nodes can be to increase network energy to a point that the network slows and cannot efficiently, or at all, cycle through its protocols or epochs, thereby effectively crippling the network. The block consensus model disclosed herein may mitigate this vector by throttling network energy usage during all processes. All nodes have a very low threshold for behavior that does not adhere to stated protocols and will sequester any node breaking this threshold. Nodes deemed to be misbehaving may be placed onto an internal suspectednode queue, where after they are completely ignored—i.e., any attempt to exchange information is rejected, thus they are unable to raise network energy. Any deviation from protocol may be considered bad behavior; too many messages, out-of-band messages, sending invalid data, non-responsiveness, and the like, are all causes for sequestering at the first instance of the bad behavior. Using their randompeers queue, nodes initiated outbound communications with at most 15 random connected active peers during gossip based protocols during any given epoch, and during each epoch, nodes may update their randompeers queue. So, at each epoch, nodes have new connected active peers to gossip with. Thus, nodes can quickly recognize out-of-band exchange attempts during any given protocol, resulting on the out-of-band node being placed onto the suspectednode queue—i.e., the nodes have many different ways to determine if a node is misbehaving and then to subsequently ignore them.

Mitigating Node Corruption

Dishonest nodes can slowly work to corrupt honest nodes by getting them to accept illegal or erroneous information and thereby corrupt the honest node relative to future epoch participation. Rather than overwhelming the entire network, dishonest nodes can simply overwhelm an honest node by establishing enough connections to represent a majority for the honest node. As such, the honest node can now be convinced that an illegal or erroneous network state is accurate. Several of the consensus methods (or processes) may be vulnerable to this type of attack vector and in a decentralized network where trust is distributed. The honest node may have to undertake subsequent processes in an epoch with illegal or erroneous information—i.e., the honest node is now acting dishonestly without intent.

However, for this to be an effective attack, the corrupted node, now acting dishonestly, may have to have means to spread the illegal or erroneous information or the erroneous information that succeeds it. To do this, it must connect with another honest node in the network. It's at this point that the corrupted node will be discovered by the honest node it attempted to exchange the erroneous information with. Because the connected peer is not overwhelmed by dishonest nodes, it may readily determine the misbehavior and place the corrupted node onto its suspectednode queue and ignore it—i.e., the corrupted node is quickly sequestered. At best, the corrupted node may create a fork in the network understanding of the blockchain; a fork may be quickly abandoned, as detailed above.

The network described herein is self-healing. Nodes placed on a suspectednode queue are not eliminated from the network. Instead, they are temporarily sequestered from the network for a certain number of blocks. While throttling misbehavior to extremely low levels, levels that the network can easily absorb, it allows corrupted nodes to re-enter the network as well behaved honest nodes at a later time. Thus, dishonest nodes cannot slowly corrupt the entire network by systematically attacking honest nodes throughout the network over time, expecting the network to eliminate those nodes. In other words, the proof of majority block consensus method creates a self-healing network.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc.

are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
updating, by a network node of a plurality of distributed network nodes via network gossiping, a peers queue containing descriptors of a random subset of peer nodes selected from connected peer nodes;
receiving, by the network node, transaction information from a first peer node in the random subset of peer nodes;
appending, by the network node, a transaction descriptor for a transaction associated with the transaction information to an unconfirmed transactions queue;
transmitting, by the network node, the transaction descriptor in the unconfirmed transactions queue to a second peer node in the random subset of peer nodes;
generating, by the network node, a transaction ballot containing a first subset of transaction descriptors in the unconfirmed transactions queue, wherein the first subset of the transaction descriptors is based upon block size of a blockchain;
receiving, by the network node, a second subset of transaction descriptors from a third peer node in the random subset of peer nodes;
updating, by the network node, the transaction ballot by appending one or more transaction descriptors from the first set of transactions, wherein the one or more transaction descriptors are not present in the transaction ballot;
transmitting, by the network node, an updated transaction ballot to a fourth node in the random subset of peer nodes;
generating, by the network node, a proposed next block to be appended to the blockchain and containing the transaction descriptors in the updated transaction ballot;
determining majority consensus of a plurality of nodes regarding a block to be appended to the blockchain by:

generating, by the network node, a first hash of the proposed next block to be appended to the blockchain by the network node;

appending, by the network node, the first hash to a hash votes queue;

receiving, by the network node, from a plurality of the connected peer nodes a plurality of hashes of respective proposed next blocks to be appended to the blockchain generated by the plurality of connected peer nodes;

determining, by the network node, which of the received hashes belongs to a majority of received hashes;

determining, by the network node, whether the first hash is the same as the received hashes that belong to the majority of received hashes;

upon determining by the network node that the first hash belongs to the majority of received hashes:
appending, by the network node, the proposed next block to a local copy of the blockchain;

upon determining by the network node that the first hash does not belong to a majority of received hashes:
transmitting, by the network node, a block request to a peer node of the connected peers nodes that generated a hash belonging to the majority of received hashes;
receiving, by the network node, a block corresponding to the majority of hashes from the peer node;
appending, by the network node, the block corresponding to the majority of hashes from the peer node to the local copy of the blockchain;

upon determining by the network node that the transaction information from the first peer node is invalid:
appending, by the network node, a descriptor of the first peer node into a suspected nodes queue; and
updating, by the network node, the suspected nodes queue in response to determining that a predetermined number of epochs have passed.

2. The method of claim 1, further comprising:
appending, by the network node, a descriptor for a peer node of the connected peer nodes that first generated a hash belonging to the majority of hashes into a time blocked queue.

3. The method of claim 1, wherein the first peer node is a wallet node.

4. The method of claim 1, further comprising:
generating, by the network node, the first hash using a 512-bit SHA3 hash function.

5. The method of claim 1, wherein the communications between the network node and the connected peer nodes is encrypted based on Elliptic Curve Cryptography using a Twisted Edwards Curve or Quantum Computing Resistant Cryptography.

6. The method of claim 1, wherein updating the transaction ballot comprises:
sorting, by the network node, the transaction descriptors in the transaction ballot according to a time stamp data field of the transaction descriptors.

7. The method of claim 1, wherein the network node is a smartphone or a tablet computer.

8. A computer readable non-transitory medium containing one or more computer instructions, which when executed by a processor of a network node cause the processor to:
update a peers queue containing descriptors of a random subset of peer nodes selected from connected peer nodes;

receive transaction information from a first peer node in the random subset of peer nodes;

append a transaction descriptor for a transaction associated with the transaction information to an unconfirmed transactions queue;

transmit the transaction descriptor in the unconfirmed transactions queue to a second peer node in the random subset of peer nodes;

generate a transaction ballot containing a first subset of transaction descriptors in the unconfirmed transactions queue, wherein the first subset of the transaction descriptors is based upon block size of a blockchain;

receive a second subset of transaction descriptors from a third peer node in the random subset of peer nodes;

update the transaction ballot by appending one or more transaction descriptors from the first set of transactions, wherein the one or more transaction descriptors are not present in the transaction ballot;

transmit an updated transaction ballot to a fourth node in the random subset of peer nodes;

generate a proposed next block to be appended to the blockchain and containing the transaction descriptors in the updated transaction ballot;

determine majority consensus of a plurality of nodes regarding a block to be appended to the blockchain by:
generate a first hash of the proposed next block to be appended to the blockchain by the network node;
append the first hash to a hash votes queue;
receive from a plurality of the connected peer nodes a plurality of hashes of the respective proposed next blocks to be appended to the blockchain generated by the plurality of connected peer nodes;
determine which of the received hashes belongs to a majority of received hashes;
determine whether the first hash is the same as the received hashes that belong to the majority of received hashes;

upon determining by the processor that the first hash belongs to a majority of the received hashes:
append the next block to a local copy of the blockchain;
upon determining by the network node that the first hash does not belong to a majority of received hashes:
transmit a block request to a peer node of the connected peers nodes that generated a hash belonging to the majority of received hashes;
receive a block corresponding to the majority of hashes from the peer node; and
append, by the network node, the block corresponding to the majority of hashes from the peer node to the local copy of the blockchain;

upon determining by the processor that the transaction information from the first peer node is invalid:
append a descriptor of the first peer node into a suspected nodes queue; and
update the suspected nodes queue in response to determining that a predetermined number of epochs have passed.

9. The computer readable non-transitory medium of claim 8, further containing one or more computer instructions, which when executed by the processor cause the processor to:
append a descriptor for a peer node of the connected peer nodes that first generated a hash belonging to the majority of hashes into a time blocked queue.

10. The computer readable non-transitory medium of claim 8, wherein the first peer node is a wallet node.

11. The computer readable non-transitory medium of claim 8, further containing one or more computer instructions, which when executed by the processor cause the processor to:
   generate the first hash using a 512-bit SHA3 hash function.

12. The computer readable non-transitory medium of claim 8, wherein the communications between the network node and the connected peer nodes is encrypted based on Elliptic Curve Cryptography using a Twisted Edwards Curve or Quantum Computing Resistant Cryptography.

13. The computer readable non-transitory medium of claim 8, further containing one or more computer instructions, which when executed by the processor cause the processor to:
   sort the transaction descriptors in the transaction ballot according to a time stamp data field of the transaction descriptors.

14. The computer readable non-transitory medium of claim 8, wherein the network node is a smartphone or a tablet computer.

\* \* \* \* \*